US011016811B2

(12) United States Patent
Willcock

(10) Patent No.: US 11,016,811 B2
(45) Date of Patent: *May 25, 2021

(54) APPARATUSES AND METHODS TO DETERMINE TIMING OF OPERATIONS

(71) Applicant: Micron Technology, Inc., Boise, ID (US)

(72) Inventor: Jeremiah J. Willcock, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,611

(22) Filed: Jun. 29, 2020

(65) Prior Publication Data

US 2020/0326987 A1 Oct. 15, 2020

Related U.S. Application Data

(60) Continuation of application No. 16/587,554, filed on Sep. 30, 2019, now Pat. No. 10,698,734, which is a division of application No. 15/082,130, filed on Mar. 28, 2016, now Pat. No. 10,430,244.

(51) Int. Cl.
*G06F 9/50* (2006.01)
*G06F 12/08* (2016.01)

(52) U.S. Cl.
CPC .......... *G06F 9/5038* (2013.01); *G06F 9/5016* (2013.01); *G06F 12/08* (2013.01)

(58) Field of Classification Search
CPC .............................. G06F 9/5038; G06F 9/5016
USPC .......................................................... 711/100
See application file for complete search history.

(56) References Cited

U.S. PATENT DOCUMENTS

| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |

(Continued)

FOREIGN PATENT DOCUMENTS

| CN | 102141905 | 8/2011 |
| EP | 0214718 | 3/1987 |

(Continued)

OTHER PUBLICATIONS

Draper, et al., "The Architecture of the DIVA Processing-In-Memory Chip," Jun. 22-26, 2002, (12 pgs.), ICS '02, etrieved from: http://www.isi.edu/~draper/papers/ics02.pdf.*

(Continued)

*Primary Examiner* — Muna A Techane
(74) *Attorney, Agent, or Firm* — Brooks, Cameron & Huebsch, PLLC

(57) ABSTRACT

The present disclosure includes apparatuses and methods to determine timing of operations. An example method includes performing a first operation type that uses a shared resource in a memory device. The method includes applying a scheduling policy for timing of continued performance of the first operation type based upon receipt of a request to the memory device for performance of a second operation type that uses the shared resource.

20 Claims, 8 Drawing Sheets

(56) References Cited

U.S. PATENT DOCUMENTS

| | | |
|---|---|---|
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shinano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 * | 6/2015 | Lin .............. G06F 9/3832 |
| 9,165,023 B2 | 10/2015 | Moskovich et al. |
| 10,430,244 B2 * | 10/2019 | Willcock .............. G06F 9/5038 |
| 10,698,734 B2 * | 6/2020 | Willcock .............. G06F 9/5038 |
| 2001/0007112 A1 | 7/2001 | Porterfield |
| 2001/0008492 A1 | 7/2001 | Higashiho |

(56) References Cited

U.S. PATENT DOCUMENTS

| | | |
|---|---|---|
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2003/0231540 A1* | 12/2003 | Lazar .............. G11C 11/40603 365/222 |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2004/0242159 A1 | 12/2004 | Calderon et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0280307 A1 | 11/2011 | MacInnis et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0114326 A1* | 5/2013 | Lee .............. G11C 29/1201 365/148 |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Ogge, et al., "Processing in Memory: Chips to Petaflops," May 23, 1997, (8 pgs.), retrieved from: http://www.es. jcf.edu/courses/cda5106/summer02/papers/kogge97PIM.pdf.*

Dybdahl, et al., "Destructive-Read in Embedded DRAM, Impact on Power Consumption," Apr. 2006, (10 pgs.), vol. 2, Issue 2, Journal of Embedded Computing—Issues in embedded single-chip multicore architectures.*

(56) References Cited

OTHER PUBLICATIONS

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www. js.cmu.edu/~damon2006/pdf/adibi06inmemory.pdf.*
Boyd et al., "On the General Applicability of Instruction-Set Randomization", Jul.-Sep. 2010, (14 pgs.), vol. 7, Issue 3, IEEE Transactions on Dependable and Secure Computing.
Stojmenovic, "Multiplicative Circulant Networks Topological Properties and Communication Algorithms", (25 pgs.), Discrete Applied Mathematics 77 (1997) 281-305.
"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.
Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.
Debnath, Biplob, Bloomflash: Bloom Filter on Flash-Based Storage, 2011 31st Annual Conference on Distributed Computing Systems, Jun. 20-24, 2011, 10 pgs.
Pagiamtzis, Kostas, "Content-Addressable Memory Introduction", Jun. 25, 2007, (6 pgs.), retrieved from: http://www.pagiamtzis.com/cam/camintro.
Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.
International Search Report and Written Opinion for PCT Application No. PCT/US2013/043702, dated Sep. 26, 2013, (11 pgs.).
Elliot, et al., "Computational RAM: Implementing Processors in Memory", Jan.-Mar. 1999, (10 pgs.), vol. 16, Issue 1, IEEE Design and Test of Computers Magazine.
Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.
Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.
Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.
U.S. Appl. No. 13/449,082, entitled, "Methods and Apparatus for Pattern Matching," filed Apr. 17, 2012, (37 pgs.).
U.S. Appl. No. 13/743,686, entitled, "Weighted Search and Compare in a Memory Device," filed Jan. 17, 2013, (25 pgs.).
U.S. Appl. No. 13/774,636, entitled, "Memory as a Programmable Logic Device," filed Feb. 22, 2013, (30 pgs.).
U.S. Appl. No. 13/774,553, entitled, "Neural Network in a Memory Device," filed Feb. 22, 2013, (63 pgs.).
U.S. Appl. No. 13/796,189, entitled, "Performing Complex Arithmetic Functions in a Memory Device," filed Mar. 12, 2013, (23 pgs.).

* cited by examiner

*Fig. 2C*

Table 213-1:

| | | 244 | 245 | 256 | 270 | 271 |
|---|---|---|---|---|---|---|
| | | A | B | NOT OPEN | OPEN TRUE | OPEN INVERT |
| | | 0 | 0 | 0 | 0 | 1 |
| | | 0 | 1 | 0 | 1 | 0 |
| 275 → (crossover) | | | | | | |
| | | 1 | 0 | 1 | 0 | 1 |
| | | 1 | 1 | 1 | 1 | 0 |

Table 213-2:

| | | | | | | | | | | | |
|---|---|---|---|---|---|---|---|---|---|---|---|
| | FF | 0 | 0 | 0 | 0 | 0 | 0 | 1 | 1 | 1 | ← 276 |
| | FT | 0 | 0 | 0 | 1 | 1 | 1 | 0 | 0 | 0 | ← 277 |
| | TF | 0 | 0 | 1 | 0 | 0 | 1 | 0 | 0 | 1 | ← 278 |
| | TT | 0 | 1 | 0 | 0 | 1 | 0 | 0 | 1 | 0 | ← 279 |
| A | B | A | A*B | A*B̄ | A+B | B | AXB | A+B̄ | ĀXB | B̄ | ← 247 |
| 0 | 0 | 0 | 0 | 0 | 0 | 0 | 0 | 1 | 1 | 1 | |
| 0 | 1 | 0 | 0 | 0 | 1 | 1 | 1 | 0 | 0 | 0 | |
| 1 | 0 | 1 | 0 | 1 | 1 | 0 | 1 | 1 | 0 | 1 | |
| 1 | 1 | 1 | 1 | 0 | 1 | 1 | 0 | 1 | 1 | 0 | |

276–279 grouped as 280.

APPARATUSES AND METHODS TO DETERMINE TIMING OF OPERATIONS

PRIORITY INFORMATION

This application is a Continuation of U.S. application Ser. No. 16/587,554, filed Sep. 30, 2019, which issues as U.S. Pat. No. 10,698,734 on Jun. 30, 2020, which is a Divisional of U.S. application Ser. No. 15/082,130, filed Mar. 28, 2016, which issued as U.S. Pat. No. 10,430,244 on Oct. 1, 2019, the contents of which are included herein by reference.

TECHNICAL FIELD

The present disclosure relates generally to semiconductor memory and methods, and more particularly, to apparatuses and methods to determine timing of operations.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAIVI), and magnetoresistive random access memory (MRAIVI), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional units such as arithmetic logic unit (ALU) circuitry, floating point unit (FPU) circuitry, and a combinatorial logic block, for example, which can be used to execute instructions by performing an operation on data (e.g., one or more operands). As used herein, an operation can be, for example, a Boolean operation, such as AND, OR, NOT, NOT, NAND, NOR, and XOR, and/or other operations (e.g., invert, shift, arithmetic, statistics, among many other possible operations). For example, functional unit circuitry may be used to perform the arithmetic operations, such as addition, subtraction, multiplication, and division on operands, via a number of logical operations.

A number of components in an electronic system may be involved in providing instructions to the functional unit circuitry for execution. The instructions may be executed, for instance, by a processing resource such as a controller and host processor. Data (e.g., the operands on which the instructions will be executed) may be stored in a memory array that is accessible by the functional unit circuitry. The instructions and data may be retrieved from the memory array and sequenced and buffered before the functional unit circuitry begins to execute instructions on the data. Furthermore, as different types of operations may be performed in one or multiple clock cycles through the functional unit circuitry, intermediate results of the instructions and data may also be sequenced and buffered.

In many instances, the processing resources (e.g., processor and associated functional unit circuitry) may be external to the memory array, and data is accessed via a bus between the processing resources and the memory array to execute a set of instructions. Processing performance may be improved in a processing in memory device, in which a processor may be implemented internally and/or near to a memory (e.g., directly on a same chip as the memory array). A processing in memory device may save time by reducing and eliminating external communications and may also conserve power. However, the potential for other functions, such as read and write operations, being performed in addition to processing operations may influence the data processing time of the processing in memory device.

BRIEF DESCRIPTION OF THE DRAWINGS

FIG. 2C shows logic tables illustrating selectable logical operation results implemented by sensing circuitry in accordance with a number of embodiments of the present disclosure.

DETAILED DESCRIPTION

Figure 1A:
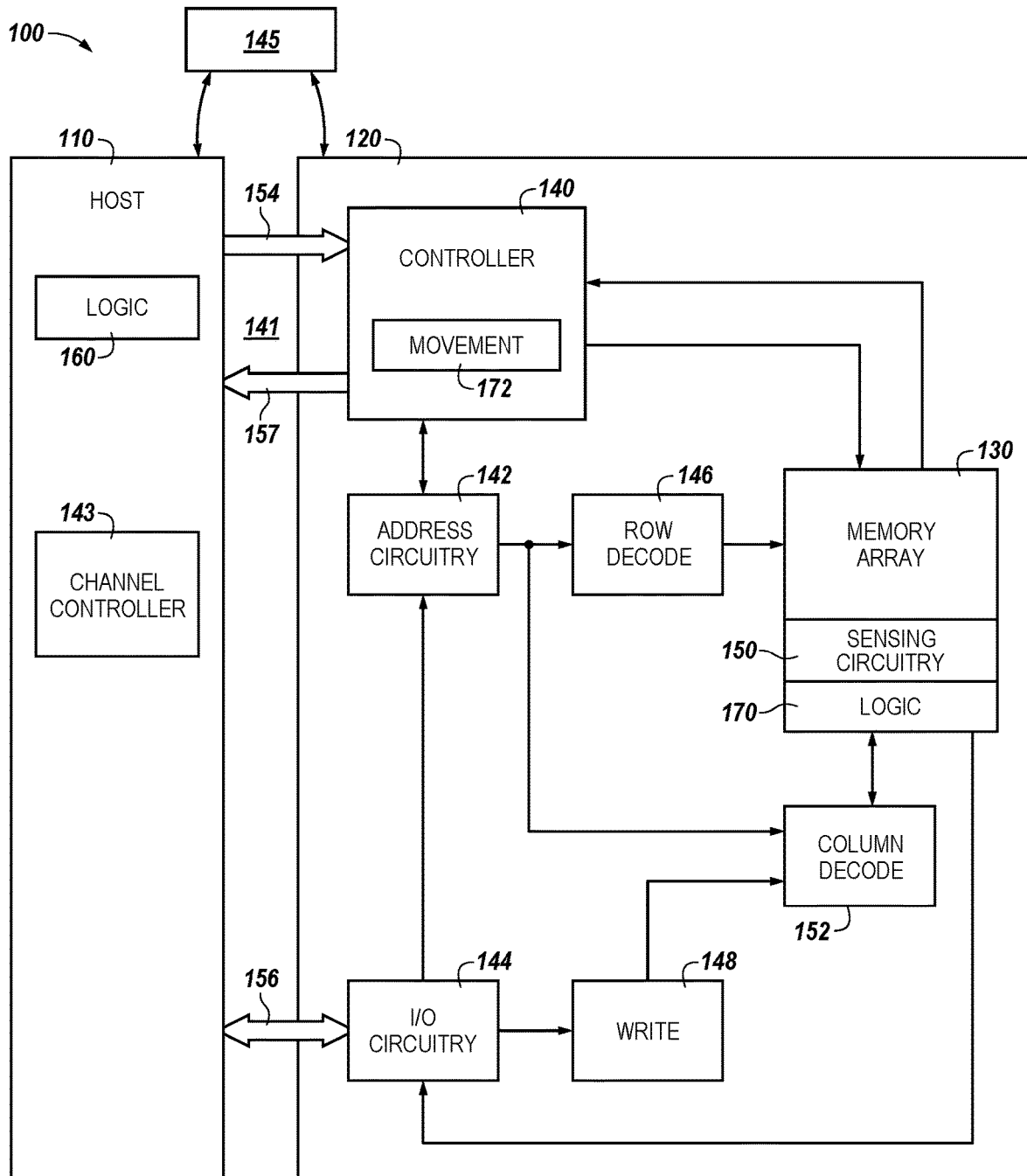
FIG. 1A is a block diagram of an apparatus in the form of a computing system including a memory device in accordance with a number of embodiments of the present disclosure.

The present disclosure includes apparatuses and methods to determine timing of operations (e.g., for processing in memory (PIM) devices). In at least one embodiment, a method includes performing a first operation type that uses a shared resource in in a memory device. The method includes applying a scheduling policy for timing of continued performance of the first operation type based upon receipt of a request to the memory device for performance of a second operation type that uses the shared resource.

Control circuitry of a memory device, such as a PIM device, may be configured such that certain types of operations (e.g., read and/or write operations) have prioritized access to sensing circuitry (e.g., sense amplifiers and/or compute components, as described herein). Previous approaches may have handled such a priority by erasing stored data values from the sensing circuitry between PIM operations, or portions thereof, to reduce a potential for competition of the PIM operations with, for example, a pending read and/or write operation for use of a shared resource (e.g., the sensing circuitry). As such, the erased data values may have been reloaded in the sensing circuitry to enable continued performance of PIM operations even though no prioritized operations were actually pending.

In contrast, the present disclosure describes control circuitry for a memory device (e.g., a PIM device) configured to enable data values to be maintained (e.g., at least temporarily stored and/or cached) in the sensing circuitry between performance of computation operations (e.g., PIM operations) that use the sense amplifiers and/or compute components of the sensing circuitry when other types of operations that have priority (e.g., memory operations, such as read and/or write operations) are not pending. The control circuitry (e.g., a controller 140 configured to execute instructions, as shown in and described in connection with FIG. 3) can be configured to use presence or absence of prioritized memory operations (e.g., DRAM read and/or write operations, among possible other operations) in an input queue (e.g., as shown at 369 in FIG. 3) in determining timing of how and when to implement continuation of initiated computation operations.

For example, the control circuitry may be configured to not erase data values from (e.g., by equilibration of) the sense amplifier and/or the compute component when no prioritized operations are pending in order to facilitate more efficient performance of the initiated sequence of computation operations. Alternatively or in addition, when no prioritized operations are pending, the control circuitry may be configured to not copy a stored data value from the sense amplifier to the compute component, or vice versa, to keep the data value accessible in the sensing circuitry for continuation of the computation operations.

When a determination is made that a prioritized operation actually is pending in the input queue, the control circuitry may be configured to adjust (e.g., interrupt) timing of performance of a sequence of initiated computation operations such that one or more of the prioritized memory operations can be interleaved (e.g., performed) between the computation operations or portions (e.g., sub-operations) thereof. The control circuitry may also be configured to abort and/or later reinitiate computation operations when one or more prioritized memory operation requests are determined to be pending in the input queue and rapid performance of the prioritized memory operations is indicated (e.g., by the requests indicating a low latency preference). As presented herein, a PIM device is a non-limiting example of a memory device, a PIM operation is a non-limiting example of a computation operation, and a DRAM operation is a non-limiting example of a memory operation, unless the context clearly indicates otherwise.

In some PIM devices (e.g., memory devices having a PIM DRAM architecture), the same memory array may be used for both computation operations (e.g., PIM operations) and other memory operations (e.g., DRAM read, write, copy, and/or erase operations, among others). Performance of these two types of operations may utilize shared resources, for example, sense amplifiers in the sensing circuitry. Thus, control circuitry may be configured with the expectation that a request for a prioritized DRAM operation may arrive and/or be pending at any time during ongoing PIM operations and that the sense amplifiers are available at any time for performance of the prioritized DRAM operation.

Some PIM operations are implemented as a sequence of sub-operations (e.g., Boolean logical operations and data movement operations, among other such operations) with units of PIM computation (e.g., atomic operations) that are not to be interrupted by DRAM operations, for example, in order to ensure proper performance of a unit of PIM computation. However, in various embodiments, DRAM operations may be interleaved between PIM operations and/or PIM sub-operations. As used herein, to interleave is intended to mean to choose between two or more digital signals, sequences, and/or operations, for example, by alternating performance of the DRAM operations and the PIM operations and/or sub-operations. Alternating the performance can result in one or more pending DRAM operations being interleaved between one or more sequentially performed PIM operations and/or sub-operations.

In some DRAM implementations, the sensing circuitry (e.g., the sense amplifiers and/or compute components therein) may be equilibrated following completion of a PIM operation and/or sub-operation, so that the sensing circuitry is prepared to receive different data values for a next PIM operation regardless of whether there are DRAM operations pending. There are some PIM operations (e.g., combined logic/shift operations, movement of data values between rows of a subarray or different subarrays, etc.) where it may be preferable not to erase the data values and/or equilibrate the sensing circuitry between PIM operations and/or sub-operations. For example, in a data movement operation in which a DRAM bank (e.g., having 64 subarrays) has data values from a row in a first subarray to be moved (e.g., copied) from the first subarray to a row in each of the other subarrays, the operation may consist of 63 iterations of the following sequence of actions. In the example sequence below, the data values from a row may have been previously received to (e.g., at least temporarily stored and/or cached by) a respective compute component in the sensing circuitry. The example sequence may include the following actions in an iteration:

1. Move (e.g., copy) the data values from the compute components into the sense amplifiers;
2. Move the data values in the sense amplifiers to another subarray (e.g., via a number of selectably coupled shared I/O lines, as described herein);
3. Move (e.g., copy) the data values in the sense amplifiers data back into the compute components; and
4. Equilibrate the sense amplifiers, thereby erasing the data values.

Actions 1, 3, and 4 of this example sequence may only have to be performed once for copying to the other 63 subarrays. Nonetheless, another 62 iterations of actions 1, 3, and 4 may be performed in order to be prepared for the possibility that a DRAM operation request is received between two of the 63 total iterations (e.g., sub-portions of a PIM operation). In some implementations, actions 1, 3, and 4 may together take 22 nanoseconds (ns) per iteration, while action 2 may take 32 ns per iteration.

Thus, not performing various actions involving data movement, copy, erase, and/or reload operations could provide improved performance for PIM operations when no or few DRAM operations are pending. For example, removing actions 1, 3, and 4 in the data movement PIM operation just presented may reduce the time taken for each iteration (e.g., by about 40%). Removing performance of the various data movement, copy, erase, and/or reload operations can be enabled, as described herein, by the control circuitry determining (e.g., during the execution of each iteration of moving the data values in the sense amplifiers in action 2) whether there are any DRAM operations pending. When the determination is that there are no pending DRAM operations, the control circuitry may proceed directly to the next iteration of action 2. In contrast, a determination of a pending DRAM operation may trigger actions 3 and 4 to be performed to prepare the sense amplifiers for performance of the DRAM operation, which would also include performance of action 1 to reload the sense amplifiers when the PIM operations are reinitiated. The control circuitry, including a timing component (e.g., timing circuitry as shown at 333 and described in connection with FIG. 3, as described herein, to determine timing of operations (e.g., such as those just described), could also contribute to reduction of DRAM operation latency without a loss of performance that would result from terminating PIM operations whose execution time exceeds a threshold time (e.g., the DRAM latency in a PIM DRAM device may be around the threshold time allowed for PIM operations).

As described in more detail below, the embodiments can allow a host system to allocate a number of locations (e.g., sub-arrays (or "subarrays")) and portions of subarrays, in one or more DRAM banks to hold (e.g., store) and/or process data. A host system and a controller may perform the address resolution on an entire block of program instructions (e.g., PIM command instructions) and data and direct (e.g., control) allocation, storage, and/or movement (e.g., flow) of data and commands into allocated locations (e.g., subarrays and portions of subarrays) within a destination (e.g., target) bank. Executing commands (e.g., performing write and/or read operations, as described herein) may utilize normal DRAM paths to the DRAM device. As the reader will appreciate, while a DRAM-style PIM device is discussed with regard to examples presented herein, embodiments are not limited to a PIM DRAM implementation.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X", "Y", "N", "M", etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of", "at least one", and "one or more" (e.g., a number of memory arrays) can refer to one or more memory arrays, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement (transmission) of commands and/or data, as appropriate to the context. The terms "data", "data units", and "data values" are used interchangeably herein and can have the same meaning, as appropriate to the context.

As described herein, an I/O line can be selectably shared by a plurality of subarrays, rows, and/or particular columns of memory cells, for example, via a sensing component stripe coupled to each of the subarrays. For example, the sense amplifier and/or compute component of each of a selectable subset of a number of columns (e.g., eight column subsets of a total number of columns) can be selectably coupled to each of a plurality of shared I/O lines for data values stored (e.g., cached) in the sense amplifiers and/or compute components of the sensing component stripe to be moved (e.g., copied, transferred, and/or transported) to each of the plurality of shared I/O lines. Because the singular forms "a", "an", and "the" can include both singular and plural referents herein, "a shared I/O line" can be used to refer to "a plurality of shared I/O lines", unless the context clearly dictates otherwise. Moreover, "shared I/O lines" is an abbreviation of "plurality of shared I/O lines".

As used herein, data movement is an inclusive term that includes, for instance, copying, transferring, and/or transporting data values from a source location to a destination location. Data can, for example, be moved from a sensing component stripe of a source subarray to a sensing component stripe of a destination subarray via an I/O line shared by the sensing component stripes of the source and destination subarrays, as described herein. Copying the data values is intended to indicate that the data values at least temporarily stored (e.g., cached) in the sensing component stripe of the source subarray are moved to the sensing component stripe of the destination subarray and that the original data values stored in the row of the source subarray may remain unchanged. Transferring the data values is intended to indicate that the data values stored (e.g., cached) in the sensing component stripe of the source subarray are moved to the sensing component stripe of the destination subarray and that at least one of the original data values stored in the row of the source subarray may be changed (e.g., by being erased and/or by a subsequent write operation, as described herein). Transporting the data values is intended to indicate the process by which the copied and/or transferred data values are moved. For example, the data values can be transported by the data values being placed from the sensing component stripe of the source location on the shared I/O line and being moved to the sensing component stripe of the destination location.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1A is a block diagram of an apparatus in the form of a computing system 100 including a memory device 120 in accordance with a number of embodiments of the present disclosure. As used herein, a memory device 120, controller 140, channel controller 143, bank arbiter 145, high speed interface (HSI) 141, memory array 130, sensing circuitry 150, logic 170, and/or data movement component 172 might also be separately considered an "apparatus."

In previous approaches, data may be transferred from a memory array and sensing circuitry (e.g., via a bus comprising input/output (I/O) lines) to a processing resource such as a processor, microprocessor, and/or compute engine, which may comprise ALU circuitry and/or other functional unit circuitry configured to perform the appropriate operations. However, transferring data from the memory array and sensing circuitry to such processing resource(s) can involve significant time and/or power consumption. Even if the processing resource is located on a same chip as the memory array, significant power can be consumed in moving data out of the array to the compute circuitry, which can involve performing a sense line (which may be referred to herein as a digit line or data line) address access (e.g., firing of a column decode signal) in order to transfer data from sense lines onto I/O lines (e.g., local I/O lines), transferring the data peripheral to the array, which may be transferred to a cache in a host, and providing the data to the peripheral compute circuitry.

Furthermore, the circuitry of the processing resource(s) (e.g., a compute engine) may not conform to pitch rules associated with a memory array. For example, the memory cells of a memory array may have a $4F^2$ or $6F^2$ cell size, where "F" is a feature size corresponding to the cells. As such, the devices (e.g., logic gates) associated with ALU circuitry of previous PIM systems may not be capable of being formed on pitch with the memory cells, which can affect chip size and/or memory density, for example. A number of embodiments of the present disclosure can include the control circuitry and/or the sensing circuitry (e.g., including sense amplifiers and/or compute components), as described herein, being formed on pitch with the memory cells of the array and being configured to (e.g., being capable of performing) compute functions (e.g., operations), such as those described herein, on pitch with the memory cells. The sensing circuitry is capable of performing data sensing and compute functions and at least temporary storage (e.g., caching) of data local to the array of memory cells.

For example, the sensing circuitry 150 described herein can be formed on a same pitch as a pair of complementary sense lines. As an example, a pair of complementary memory cells may have a cell size with a $6F^2$ pitch (e.g., 3F×2F). If the pitch of a pair of complementary sense lines for the complementary memory cells is 3F, then the sensing circuitry being on pitch indicates the sensing circuitry (e.g., a sense amplifier and corresponding compute component per respective pair of complementary sense lines) is formed to fit within the 3F pitch of the complementary sense lines.

Furthermore, the circuitry of the processing resource(s) (e.g., a compute engine, such as an ALU) of various prior systems may not conform to pitch rules associated with a memory array. For example, the memory cells of a memory array may have a $4F^2$ or $6F^2$ cell size. As such, the devices (e.g., logic gates) associated with ALU circuitry of previous systems may not be capable of being formed on pitch with the memory cells (e.g., on a same pitch as the sense lines), which can affect chip size and/or memory density, for example. In the context of some computing systems and subsystems (e.g., a central processing unit (CPU)), data may be processed in a location that is not on pitch and/or on chip with memory (e.g., memory cells in the array), as described herein. The data may be processed by a processing resource associated with a host, for instance, rather than on pitch with the memory.

In contrast, a number of embodiments of the present disclosure can include the sensing circuitry 150 (e.g., including sense amplifiers and/or compute components) being formed on pitch with the memory cells of the array. The sensing circuitry 150 can be configured for (e.g., capable of) performing compute functions (e.g., logical operations).

PIM capable device operations can use bit vector based operations. As used herein, the term "bit vector" is intended to mean a number of bits on a bit vector memory device (e.g., a PIM device) stored in a row of an array of memory cells and/or in sensing circuitry. Thus, as used herein a "bit vector operation" is intended to mean an operation that is performed on a bit vector that is a portion of virtual address space and/or physical address space (e.g., used by a PIM device). In some embodiments, the bit vector may be a physically contiguous number of bits on the bit vector memory device stored physically contiguous in a row and/or in the sensing circuitry such that the bit vector operation is performed on a bit vector that is a contiguous portion of the virtual address space and/or physical address space. For example, a row of virtual address space in the PIM device may have a bit length of 16K bits (e.g., corresponding to 16K complementary pairs of memory cells in a DRAM configuration). Sensing circuitry 150, as described herein, for such a 16K bit row may include a corresponding 16K processing elements (e.g., compute components, as described herein) formed on pitch with the sense lines selectably coupled to corresponding memory cells in the 16 bit row. A compute component in the PIM device may operate as a one bit processing element on a single bit of the bit vector of the row of memory cells sensed by the sensing circuitry 150 (e.g., sensed by and/or stored in a sense amplifier paired with the compute component, as described herein).

In order to appreciate the improved timing of operations described herein, a discussion of an apparatus for implementing such techniques (e.g., a memory device having PIM capabilities and an associated host) follows. According to various embodiments, program instructions (e.g., PIM commands) involving a memory device having PIM capabilities can distribute implementation of the PIM commands and data over multiple sensing circuitries that can implement operations and can move and store the PIM commands and data within the memory array (e.g., without having to transfer such back and forth over an A/C and data bus between a host and the memory device). Thus, data for a memory device having PIM capabilities can be accessed and used in less time and/or using less power. For example, a time and power advantage can be realized by increasing the speed, rate, and/or efficiency of data being moved around and stored in a computing system in order to process requested memory array operations (e.g., reads and/or writes as DRAM operations and/or PIM operations, such as logical Boolean operations, data movement operations, etc.).

The system 100 illustrated in FIG. 1A can include a host 110 coupled (e.g., connected) to memory device 120, which includes the memory array 130. Host 110 can be a host system such as a personal laptop computer, a desktop computer, a tablet computer, a digital camera, a smart phone, or a memory card reader, among various other types of hosts. Host 110 can include a system motherboard and backplane and can include a number of processing resources (e.g., one or more processors, microprocessors, or some other type of controlling circuitry). The system 100 can include separate integrated circuits or both the host 110 and the memory device 120 can be on the same integrated circuit. The system 100 can be, for instance, a server system and a high performance computing (HPC) system and a portion thereof. Although the example shown in FIG. 1A illustrates a system having a Von Neumann architecture, embodiments of the present disclosure can be implemented in non-Von Neumann architectures, which may not include one or more components (e.g., CPU, ALU, etc.) often associated with a Von Neumann architecture.

For clarity, description of the system 100 has been simplified to focus on features with particular relevance to the present disclosure. For example, in various embodiments, the memory array 130 can be a DRAM array, SRAM array, STT RAM array, PCRAM array, TRAM array, RRAM array, NAND flash array, and NOR flash array, for instance. The memory array 130 can include memory cells arranged in rows coupled by access lines (which may be referred to herein as word lines or select lines) and columns coupled by sense lines (which may be referred to herein as data lines or digit lines). Although a single memory array 130 is shown in FIG. 1A, embodiments are not so limited. For instance, memory device 120 may include a number of memory arrays 130 (e.g., a number of banks of DRAM cells, NAND flash cells, etc.) in addition to a number of subarrays, as described herein.

The memory device 120 can include address circuitry 142 to latch address signals provided over a data bus 156 (e.g., an I/O bus from the host 110) by I/O circuitry 144 (e.g., provided to external ALU circuitry and to DRAM DQs via local I/O lines and global I/O lines). As used herein, DRAM DQs can enable input of data to and output of data from a bank (e.g., from and/or to the controller 140 and/or host 110) via a bus (e.g., data bus 156). During a write operation, a voltage (high=1, low=0) can be applied to a DQ (e.g., a pin). This voltage can be translated into an appropriate signal and stored in a selected memory cell. During a read operation, a data value read from a selected memory cell can appear at the DQ once access is complete and the output is enabled (e.g., by the output enable signal being low). At other times, DQs can be in a high impedance state, such that the DQs do not source or sink current and do not present a signal to the system. This also may reduce DQ contention when two or more devices (e.g., banks) share the data bus.

Status and exception information can be provided from the controller 140 on the memory device 120 to a channel controller 143, for example, through a high speed interface (HSI) out-of-band (OOB) bus 157, which in turn can be provided from the channel controller 143 to the host 110. The channel controller 143 can include a logic component 160 to allocate a plurality of locations (e.g., controllers for subarrays) in the arrays of each respective bank to store bank commands, application instructions (e.g., as sequences of operations), and arguments (PIM commands) for the various banks associated with operation of each of a plurality of memory devices (e.g., 120-0, 120-1, . . . , 120-N). The channel controller 143 can dispatch commands (e.g., PIM commands) to the plurality of memory devices 120-1, . . . , 120-N to store those program instructions within a given bank of a memory device.

Address signals are received through address circuitry 142 and decoded by a row decoder 146 and a column decoder 152 to access the memory array 130. Data can be sensed (read) from memory array 130 by sensing voltage and/or current changes on sense lines (digit lines), for example, using a number of sense amplifiers of the sensing circuitry 150. A sense amplifier can read and latch a page (e.g., a row) of data from the memory array 130. Additional compute components, as described herein, can be coupled to the sense amplifiers and can be used in combination with the sense amplifiers to sense, store (e.g., cache and buffer), perform compute functions (e.g., operations) on, and/or move data. The I/O circuitry 144 can be used for bi-directional data communication with host 110 over the data bus 156 (e.g., a 64 bit wide data bus). The write circuitry 148 can be used to write data to the memory array 130.

Controller 140 (e.g., bank control logic and sequencer) can decode signals (e.g., commands) provided by control bus 154 from the host 110. These signals can include chip enable signals, write enable signals, and/or address latch signals that can be used to control operations performed on the memory array 130 (e.g., using control circuitry as described in connection with FIG. 3), including data sense, data store, data movement, data compute (PIM), data read, data write, and/or data erase operations, among other operations. The control circuitry having instructions (e.g., stored in hardware, such as an application-specific integrated circuit (ASIC), firmware, and/or software embodiments) can be associated with the controller 140. Data movement (e.g., between and/or within subarrays via a shared I/O line) can be controlled by a data movement component 172 that, in some embodiments, may be associated with the controller 140 (e.g., of a bank). In various embodiments, the controller 140 can be responsible for executing instructions from the host 110 and accessing the memory array 130. The controller 140 can be a state machine, a sequencer, or some other type of controller. The controller 140 can control shifting data (e.g., right or left) in a row of an array (e.g., memory array 130).

Examples of the sensing circuitry 150 are described further below (e.g., in connection with FIGS. 2A-2C). For instance, in various embodiments, the sensing circuitry 150 can include a number of sense amplifiers and a number of compute components. A compute component may serve as an accumulator and can be used to perform operations as directed by a controller 140 and/or a respective subarray controller (not shown) of each subarray (e.g., on data associated with complementary sense lines). In some embodiments, a compute component can be coupled to each sense amplifier (e.g., as shown at 231 and 206, respectively, in FIGS. 2A and 2B) within the sensing circuitry 150 in each respective sensing component stripe coupled to a subarray (e.g., in sensing component stripes 124-0 and 124-1 coupled respectively to subarrays 125-0 and 125-1 shown in and described in connection with FIG. 1B). However, embodiments are not so limited. For example, in some embodiments, there may not be a 1:1 correlation between the number of sense amplifiers and compute components (e.g., there may be more than one sense amplifier per compute component or more than one compute component per sense amplifier, which may vary between subarrays, banks, etc.).

In a number of embodiments, the sensing circuitry 150 can be used to perform operations using data stored in memory array 130 as input and participate in movement of the data for reading, writing, logical, copy and/or transfer, and storage operations to a different location in the memory array 130 without transferring the data via a sense line address access (e.g., without firing a column decode signal). As such, various compute functions (PIM operations) can be performed using, and within, the sensing circuitry 150 rather than (or in association with) being performed by processing resources external to the sensing circuitry 150 (e.g., by a processor associated with host 110 and other processing circuitry, such as ALU circuitry, located on device 120, such as on controller 140 or elsewhere).

In various previous approaches, data associated with an operand, for instance, would be read from memory via sensing circuitry and provided to external ALU circuitry via I/O lines (e.g., via local I/O lines and global I/O lines). The external ALU circuitry could include a number of registers and would perform compute functions using the operands, and the result would be transferred back to the array via the I/O lines.

In contrast, as described herein, sensing circuitry 150 is configured to perform operations on data stored in memory array 130 and to store the result back to the memory array 130 without enabling a local I/O line and global I/O line coupled to the sensing circuitry 150. The sensing circuitry 150 can be formed on pitch with the memory cells of the array. Additional peripheral sense amplifiers and/or logic 170 (e.g., subarray controllers that each execute instructions for performing a respective operation) can be coupled to the sensing circuitry 150. The sensing circuitry 150 and the peripheral sense amplifier and logic 170 can cooperate in performing operations, according to some embodiments herein.

As such, in a number of embodiments, circuitry external to memory array 130 and sensing circuitry 150 is not needed to perform compute functions, as the sensing circuitry 150 can perform the appropriate operations in order to perform such compute functions (e.g., in a sequence of instructions) without the use of an external processing resource. Therefore, the sensing circuitry 150 may be used to complement or to replace, at least to some extent, such an external processing resource (or at least reduce the bandwidth consumption of transfer of data to and/or from such an external processing resource).

In a number of embodiments, the sensing circuitry 150 may be used to perform operations (e.g., to execute a sequence of instructions) in addition to operations performed by an external processing resource (e.g., host 110). For example, either of the host 110 and the sensing circuitry 150 may be limited to performing only certain operations and/or a certain number of operations.

Enabling a local I/O line and/or global I/O line can include enabling (e.g., turning on, activating) a transistor having a gate coupled to a decode signal (e.g., a column decode signal) and a source/drain coupled to the I/O line. However, embodiments are not limited to not enabling a local I/O line and/or global I/O line. For example, in a number of embodiments, the sensing circuitry 150 can be used to perform operations without enabling column decode lines of the array. However, the local I/O line(s) and/or global I/O line(s) may be enabled in order to transfer a result to a suitable location other than back to the memory array 130 (e.g., to an external register).

Figure 1B:
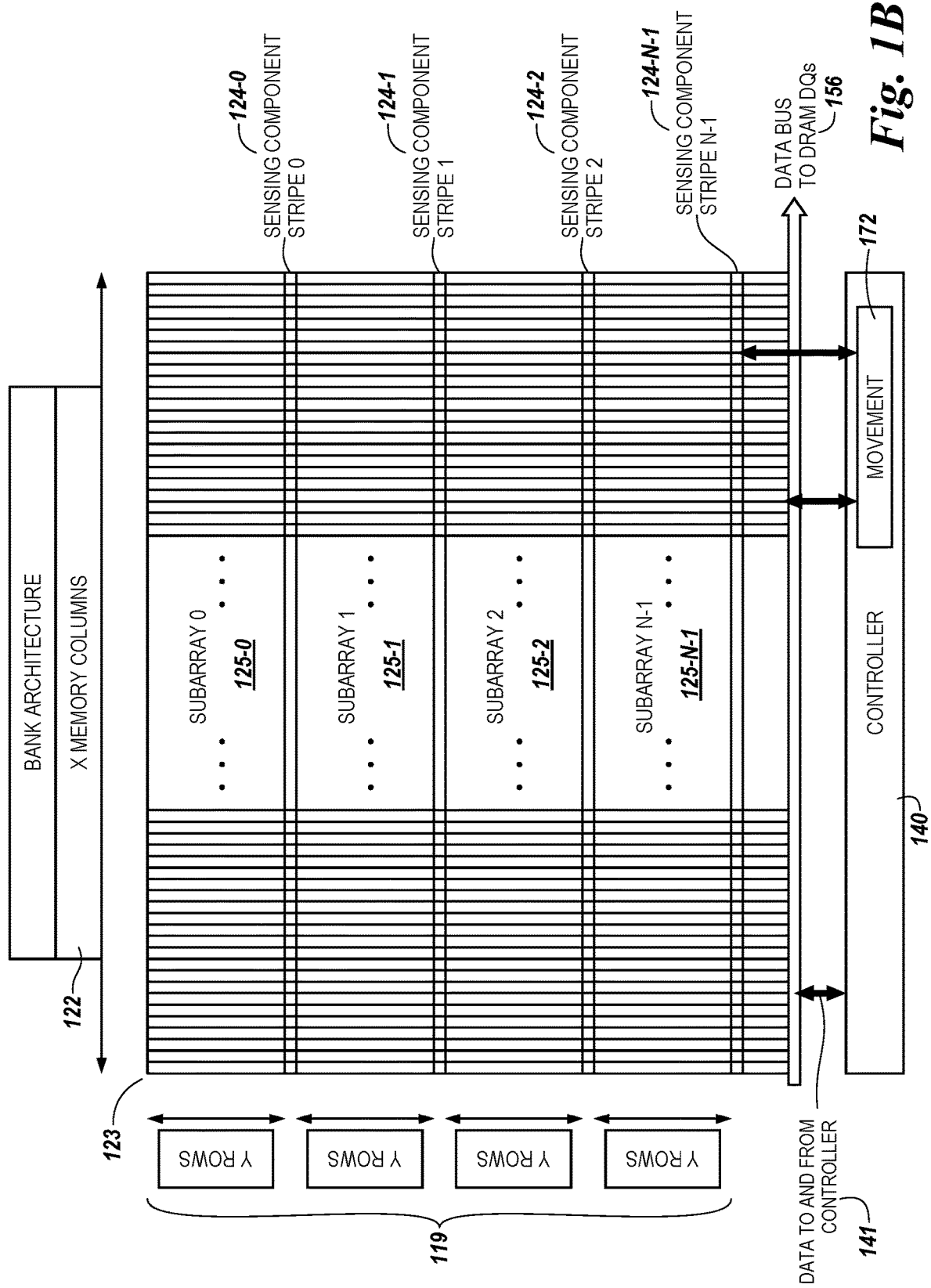
FIG. 1B is a block diagram of a bank section of a memory device in accordance with a number of embodiments of the present disclosure.

FIG. 1B is a block diagram of a bank section 123 of a memory device in accordance with a number of embodiments of the present disclosure. For example, bank section 123 can represent an example section of a number of bank sections of a bank of a memory device (e.g., bank section 0, bank section 1, . . . , bank section M−1). As shown in FIG. 1B, a bank section 123 can include a plurality of memory columns 122 shown horizontally as X (e.g., 4096, 8192, or 16,384 columns, among various possibilities, in an example DRAM bank and bank section). Additionally, the bank section 123 may be divided into subarray 0, subarray 1, . . . , and subarray N−1 (e.g., 32, 64, or 128 subarrays, among various possibilities) shown at 125-0, 125-1, . . . , 125-N−1, respectively, that are separated by amplification regions configured to be coupled to a data path. As such, the subarrays 125-0, 125-1, . . . , 125-N−1 can each have amplification regions 124-0, 124-1, . . . , 124-N−1 that correspond to sensing component stripe 0, sensing component stripe 1, . . . , and sensing component stripe N−1, respectively.

Each column 122 is configured to be coupled to sensing circuitry 150, as described in connection with FIG. 1A and elsewhere herein. As such, each column in a subarray can be coupled individually to a sense amplifier that contributes to a sensing component stripe for that subarray. For example, as shown in FIG. 1B, the bank section 123 can include sensing component stripe 0, sensing component stripe 1, . . . , sensing component stripe N−1 that each have sensing circuitry 150 with sense amplifiers that can, in various embodiments, be used as registers, cache and/or data buffering and that are coupled to each column 122 in the subarrays 125-0, 125-1, . . . , 125-N−1.

Each of the of the subarrays 125-0, 125-1, . . . , 125-N−1 can include a plurality of rows 119 shown vertically as Y (e.g., each subarray may include 256, 512, 1024 rows, among various possibilities, in an example DRAM bank). Embodiments are not limited to the example horizontal and vertical orientation of columns and rows described herein or the example numbers thereof.

The sensing circuitry 150 and the rows 119 of the memory array 130, as shown in FIG. 1A, can be connected (e.g., selectably coupled) as directed by the data movement component 172 associated with the controller 140. The data values stored in a row 119 of a subarray 125 can be moved, for example, from corresponding memory cells in the array 130 to sense amplifiers and/or compute components of the sensing circuitry 150 and/or between various sense amplifiers and/or compute components in different portions of the sensing circuitry 150, as directed by the data movement component 172, for performance of the operations described herein. Timing of the PIM operations, for example, relative to the presence or absence of pending DRAM operations, may be directed by timing circuitry 333 (e.g., as shown in and described in connection with FIG. 3) of the control circuitry associated with the controller 140. In some embodiments, instructions may be input from the host 110 to the controller 140 via the data bus 156.

The portions of the sensing circuitry 150 can be separated between a number of sensing component stripes 124 that are each physically associated with a subarray 125 of memory cells in a bank section 123, as shown in FIG. 1B. The sense amplifiers may sense data values in memory cells of the subarrays and/or the sense amplifiers may at least temporarily store (e.g., cache) sensed data values and the compute components may perform compute operations on the cached data values in the plurality of sensing component stripes 124. The plurality of sensing component stripes 124 may each be physically associated with a subarray 125 of memory cells in the bank section 123, as shown in FIG. 1B.

As shown in FIG. 1B, the bank section 123 can be associated with controller 140. The controller 140 shown in FIG. 1B can, in various examples, represent at least a portion of the functionality embodied by and contained in the controller 140 shown in FIG. 1A. The controller 140 can direct (e.g., control) input of commands and data 141 to the bank section 123 and/or output (e.g., movement) of data from the bank section 123 (e.g., to the host 110), along with control of data movement in the bank section 123 by the data movement component 172, as described herein. The bank section 123 can include the data bus 156 (e.g., a 64 bit wide data bus) to DRAM DQs, which can correspond to the data bus 156 described in connection with FIG. 1A. Each data bus 156 for each bank of subarrays (e.g., 125-0, 125-1, . . . , 125-N−1) can be referred to as a portion of a data bus that contributes to formation of a combined data bus (e.g., for a plurality of banks and/or memory devices). As such, in some embodiments, eight 64 bit wide data bus portions for eight banks can contribute to a 512 bit wide combined data bus.

Figure 2A:
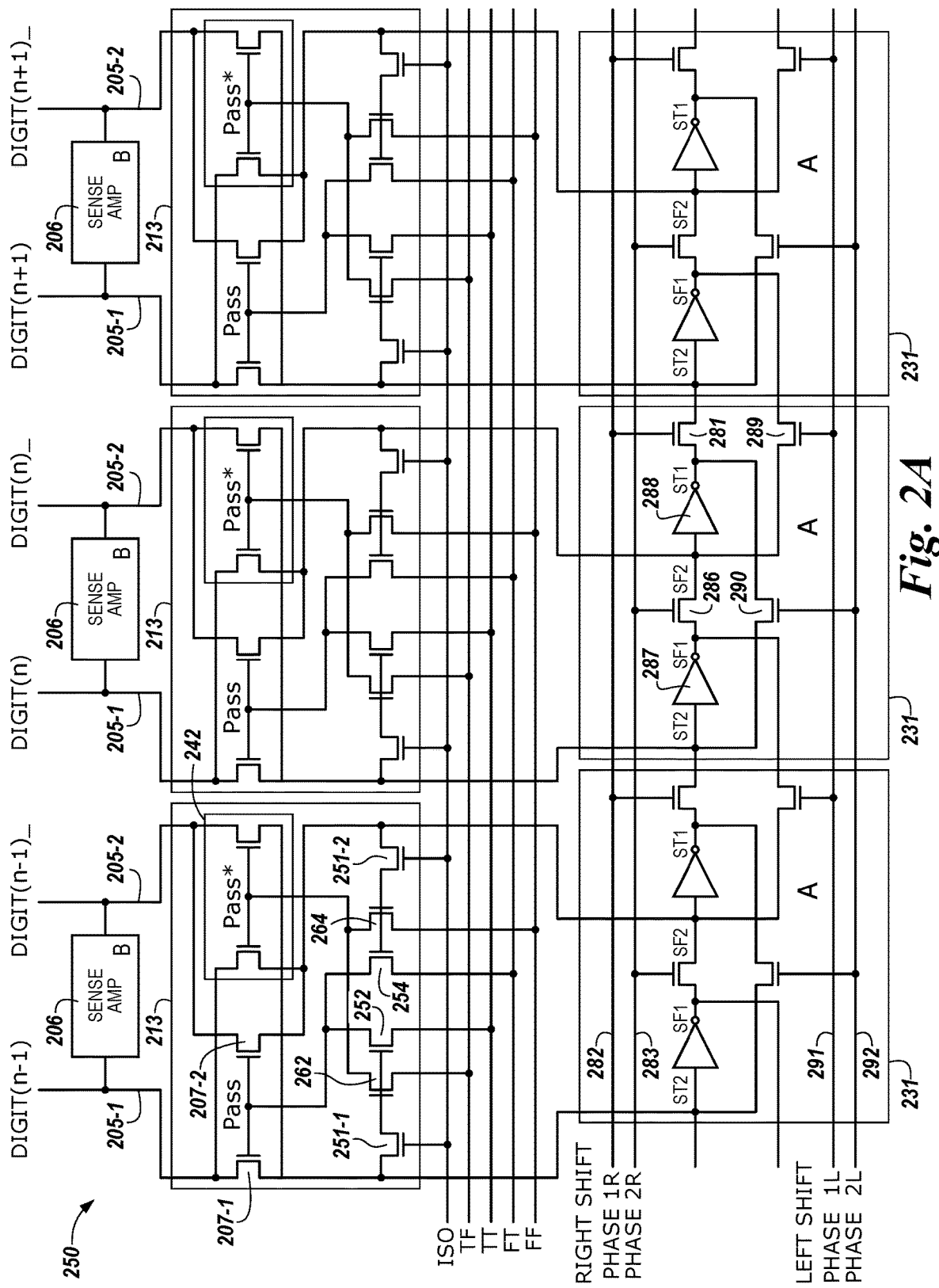
FIGS. 2A and 2B are schematic diagrams illustrating sensing circuitry in accordance with a number of embodiments of the present disclosure.

FIG. 2A is a schematic diagram illustrating sensing circuitry 250 capable of implementing a number of logical operations and/or shift operations in accordance with a number of embodiments of the present disclosure. FIG. 2A shows a number of sense amplifiers 206 coupled to respective pairs of complementary sense lines 205-1 and 205-2, and a corresponding number of compute components 231 coupled to the sense amplifiers 206 via pass gates 207-1 and 207-2. The sense amplifiers 206 and compute components 231 shown in FIG. 2A can correspond to sensing circuitry 150 shown in FIG. 1A and/or the sensing circuitry 150 associated with the plurality of sensing component stripes 124 shown in FIG. 1B, for example. The sensing circuitry 250 shown in FIG. 2A includes logical operation selection logic 213, which can be operated as described further below.

Although not shown, memory cells are coupled to the pairs of complementary sense lines 205-1 and 205-2 (e.g., columns). For example, a memory cell can comprise a transistor and a capacitor. The memory cells can be, for example, 1T1C DRAM cells each comprising a storage element (e.g., capacitor) and an access device (e.g., transistor), although other embodiments of configurations can be used (e.g., 2T2C with two transistors and two capacitors per memory cell). In a number of embodiments, the memory cells may be destructive read memory cells (e.g., reading the data stored in the cell destroys the data such that the data originally stored in the cell may be refreshed after being read). The cells of the memory array can be arranged in rows coupled by word lines and columns coupled by pairs of complementary data lines DIGIT(n−1)/DIGIT(n−1)_, DIGIT(n)/DIGIT(n)_, DIGIT(n+1)/DIGIT(n+1)_. The individual data lines corresponding to each pair of complementary data lines can also be referred to as data lines 205-1 (D) and 205-2 (D_) respectively. Although only three pairs of complementary data lines (e.g., three columns) are shown in FIG. 2A, embodiments of the present disclosure are not so limited. For example, an array of memory cells can include additional columns of memory cells and/or data lines (e.g., 4,096, 8,192, 16,384, etc.).

Memory cells can be coupled to different data lines and/or word lines. For example, a first source/drain region of an access transistor of a memory cell can be coupled to a data line 205-1 (D), a second source/drain region of the access transistor of the memory cell can be coupled to a capacitor of the memory cell, and a gate of the access transistor of the memory cell can be coupled to a word line of the memory array.

As shown in FIG. 2A, the sensing circuitry 250 can comprise a sense amplifier 206, a compute component 231, and logical operation selection logic 213 corresponding to respective columns of memory cells (e.g., coupled to respective pairs of complementary data lines). The sense amplifier 206 can comprise, for example, a cross coupled latch, which can be referred to herein as a primary latch. The sense amplifiers 206 can be configured, for example, as described with respect to FIG. 2B.

In the example illustrated in FIG. 2A, the circuitry corresponding to compute component 231 is configured as a loadable shift register. For example, each compute component 231 comprises a latch, which may be referred to herein as a secondary latch, and an additional number of transistors operable to transfer (e.g., shift) data units right and/or left (e.g., to a latch of an adjacent compute component 231). In a number of embodiments, the latch of the compute component 231 can serve as an accumulator. As such, the compute component 231 can operate as and/or may be referred to herein as an accumulator.

The gates of the pass gates 207-1 and 207-2 can be controlled by a logical operation selection logic signal, Pass. For example, an output of the logical operation selection logic 213 can be coupled to the gates of the pass gates 207-1 and 207-2, as shown in FIG. 2A.

The sensing circuitry 250 illustrated in FIG. 2A also shows logical operation selection logic 213 coupled to a number of logic selection control input control lines, including ISO, TF, TT, FT, and FF. Selection of a logical operation from a plurality of logical operations is determined from the condition of logic selection control signals on the logic selection control input control lines, as well as the data units present on the pairs of complementary sense lines 205-1 and 205-2 when the isolation transistors (e.g., 251-1 and 251-2) are enabled via an ISO control signal being activated.

In various embodiments, the logical operation selection logic 213 can include four logic selection transistors: logic selection transistor 262 coupled between the gates of the swap transistors 242 and a TF signal control line, logic selection transistor 252 coupled between the gates of the pass gates 207-1 and 207-2 and a TT signal control line, logic selection transistor 254 coupled between the gates of the pass gates 207-1 and 207-2 and a FT signal control line, and logic selection transistor 264 coupled between the gates of the swap transistors 242 and a FF signal control line. Gates of logic selection transistors 262 and 252 are coupled to the true sense line through isolation transistor 251-1 (having a gate coupled to an ISO signal control line). Gates of logic selection transistors 264 and 254 are coupled to the complementary sense line through isolation transistor 251-2 (also having a gate coupled to an ISO signal control line).

Data units present on the pair of complementary sense lines 205-1 and 205-2 can be loaded into the compute component 231 via the pass gates 207-1 and 207-2. When the pass gates 207-1 and 207-2 are OPEN, data units on the pair of complementary sense lines 205-1 and 205-2 are passed to the compute component 231 and thereby loaded into the loadable shift register. The data unit on the pair of complementary sense lines 205-1 and 205-2 can be the data unit stored at least temporarily in the sense amplifier 206 when the sense amplifier is enabled (e.g., fired). The logical operation selection logic signal, Pass, is activated to OPEN (e.g., turn on) the pass gates 207-1 and 207-2.

The ISO, TF, TT, FT, and FF control signals can operate to select a logical operation to implement based on the data unit ("B") in the sense amplifier 206 and the data unit ("A") in the compute component 231 (e.g., as used herein, the data unit stored in a latch of a sense amplifier is referred to as a "B" data unit, and the data unit stored in a latch of a compute component is referred to as an "A" data unit). In particular, the ISO, TF, TT, FT, and FF control signals are configured to select the logical operation (e.g., function) to implement independent from the data unit present on the pair of complementary sense lines 205-1 and 205-2 (although the result of the implemented logical operation can be dependent on the data unit present on the pair of complementary sense lines 205-1 and 205-2). For example, the ISO, TF, TT, FT, and FF control signals can select the logical operation to implement directly because the data unit present on the pair of complementary sense lines 205-1 and 205-2 is not passed through logic to operate the gates of the pass gates 207-1 and 207-2.

Additionally, FIG. 2A shows swap transistors 242 configured to swap the orientation of the pair of complementary sense lines 205-1 and 205-2 between the sense amplifier 206 and the compute component 231. For example, when the swap transistors 242 are OPEN (e.g., turned on), data units on the pair of complementary sense lines 205-1 and 205-2 on the sense amplifier 206 side of the swap transistors 242 are oppositely-coupled to the pair of complementary sense lines 205-1 and 205-2 on the compute component 231 side of the swap transistors 242, and thereby loaded into the loadable shift register of the compute component 231 in a complementary manner.

As an example, the logical operation selection logic signal Pass can be activated (e.g., high) to OPEN (e.g., turn on) the pass gates 207-1 and 207-2 when the ISO control signal line is activated and either the TT control signal is activated (e.g., high) with the data unit on the true sense line being "1" or the FT control signal is activated (e.g., high) with the data unit on the complement sense line being "1."

The data unit on the true sense line being a "1" OPENs logic selection transistors 252 and 262. The data unit on the complementary sense line being a "1" OPENs logic selection transistors 254 and 264. If the ISO control signal or either the respective TT/FT control signal or the data unit on the corresponding sense line (e.g., sense line to which the gate of the particular logic selection transistor is coupled) is not high, then the pass gates 207-1 and 207-2 will not be OPENed by a particular logic selection transistor.

The logical operation selection logic signal Pass* can be activated (e.g., high) to OPEN (e.g., turn on) the swap transistors 242 when the ISO control signal line is activated and either the TF control signal is activated (e.g., high) with data unit on the true sense line being "1," or the FF control signal is activated (e.g., high) with the data unit on the complement sense line being "1." If either the respective control signal or the data unit on the corresponding sense line (e.g., sense line to which the gate of the particular logic selection transistor is coupled) is not high, then the swap transistors 242 will not be OPENed by a particular logic selection transistor.

The sensing circuitry 250 illustrated in FIG. 2A is configured to select one of a plurality of logical operations to implement directly from the four logic selection control signals (e.g., logical operation selection is not dependent on the data unit present on the pair of complementary sense lines). Some combinations of the logic selection control signals can cause both the pass gates 207-1 and 207-2 and swap transistors 242 to be OPEN (e.g., conducting) at the same time, which shorts the pair of complementary sense lines 205-1 and 205-2 together. In a number of embodiments, the logical operations that can be implemented by the sensing circuitry 250 illustrated in FIG. 2A can be the logical operations summarized in the logic tables shown in FIG. 2C.

Although not shown in FIG. 2A, each column of memory cells can be coupled to a column decode line that can be activated to transfer, via a local I/O line, a data unit from a corresponding sense amplifier 206 and/or compute component 231 to a control component external to the array such as an external processing resource (e.g., host processor and/or other functional unit circuitry). The column decode line can be coupled to a column decoder (e.g., column decoder 152 in FIG. 1A). However, as described herein, data need not be transferred via such I/O lines to perform logical operations. For example, shift circuitry can be operated in conjunction with sense amplifiers 206 and compute components 231 to perform shift operations without transferring data to a control component external to the array, for example. As used herein, transferring data can include, for example, moving data from a source location to a destination location without necessarily maintaining a copy of the data at the source location.

As noted above, the compute components 231 can comprise a loadable shift register. In this example, each compute component 231 is coupled to a corresponding pair of complementary data lines 205-1/205-2, with a node ST2 being coupled to the particular data line (e.g., DIGIT(n)) communicating a "true" data unit and with node SF2 being coupled to the corresponding complementary data line (e.g., DIGIT(n)_) communicating the complementary data unit (e.g., "false" data unit).

In this example, the loadable shift register comprises a first right-shift transistor 281 of a particular compute component 231 having a gate coupled to a first right-shift control line 282 (e.g., PHASE 1R), and a second right-shift transistor 286 of the particular compute component 231 having a gate coupled to a second right-shift control line 283 (e.g., PHASE 2R). Node ST2 of the particular control component is coupled to an input of a first inverter 287, whose output (e.g., node SF1) is coupled to a first source/drain region of transistor 286. The second source/drain region of transistor 286 is coupled to the input (e.g., node SF2) of a second inverter 288. The output (e.g., node ST1) of inverter 288 is coupled to a first source/drain region of transistor 281, and a second source/drain region of transistor 281 the particular compute component 231 is coupled to an input (e.g., node ST2) of a first inverter 287 of an adjacent compute component 231. The loadable shift register shown in FIG. 2A includes a first left-shift transistor 289 coupled between node SF2 of a particular compute component and node SF1 of an adjacent compute component 231. The loadable shift register shown in FIG. 2A also includes a second left-shift transistor 290 of a particular compute component 231 having a first source/drain region coupled to node ST2 and a second source/drain region coupled to node ST1. The gate of the first left-shift transistor 289 is coupled to a first left-shift control line 291 (e.g., PHASE 1L), and the gate of the second left-shift transistor 290 is coupled to a second left-shift control line 492 (e.g., PHASE 2L).

In operation, a data unit on a pair of complementary data lines (e.g., 205-1/205-2) can be loaded into a corresponding compute component 231 (e.g., by operating logical operation selection logic as described above). For example, a data unit can be loaded into a compute component 231 via overwriting of the data unit currently stored in the compute component 231 with the data unit stored in the corresponding sense amplifier 206. Alternatively, a data unit may be loaded into a compute component by deactivating the control lines 282, 283, 291, and 292.

Once a data unit is loaded into a compute component 231, the "true" data unit is separated from the complement data unit by the first inverter 287. Shifting data to the right (e.g., to an adjacent compute component 231) can include alternating operation of the first right-shift transistor 281 and the second right-shift transistor 286, for example, via the PHASE 1R and PHASE 2R control signals being periodic signals that go high out of phase from one another (e.g., non-overlapping alternating square waves 180 out of phase). The transistor 290 can be turned on to latch the shifted data unit.

An example of shifting data left via the shift register shown in FIG. 2A can include operating control signals 291 and 292 to move a data unit one control component to the left through transistors 289 and 290. Data from node ST2 is inverted through inverter 287 to node SF1. Activation of control signal 291 causes the data from node SF1 to move left through transistor 289 to node SF2 of a left-adjacent compute component 231. Data from node SF2 is inverted through inverter 288 to node ST1. Subsequent activation of control signal 292 causes the data from node ST1 to move through transistor 290 left to node ST2, which completes a left shift by one compute component 231. Data can be "bubbled" to the left by repeating the left shift sequence multiple times. Data units can be latched (and prevented from being further shifted) by maintaining the control signal 292 activated.

Embodiments of the present disclosure are not limited to the shifting capability described in association with the compute components 231. For example, a number of embodiments can include shift circuitry in addition to and/or instead of the shift circuitry described in association with a loadable shift register.

The sensing circuitry 250 in FIG. 2A can be operated in several modes to perform logical (PIM) operations, including a first mode in which a result of the logical operation is initially stored in the sense amplifier 206, and a second mode in which a result of the logical operation is initially stored in the compute component 231. Additionally with respect to the first operating mode, sensing circuitry 250 can be operated in both pre-sensing (e.g., sense amplifiers fired before logical operation control signal active) and post-sensing (e.g., sense amplifiers fired after logical operation control signal active) modes with a result of a logical operation being initially stored in the sense amplifier 206.

In a number of examples, the sense amplifier 206 and the compute component 231 can be in at least one of two states associated with the first mode and the second mode. As used herein, a state of a sense amplifier 206 and/or the compute component 231 can describe a transfer of data between the sense amplifier 206 and/or the compute component 231. The state of the sense amplifier 206 and/or the compute component 231 can also be described as whether the sense amplifier 206 and/or the compute component 231 is in an equilibration state or is storing a data unit (e.g., a binary 0 or 1 data value). For example, a sense amplifier can be configured to be in an initial state, wherein the initial state is one of an equilibration state and a data storage state.

A data storage state can include the sense amplifiers 206 storing a data unit. As used herein, a data unit can be referred to as a bit and/or a digit value. Data can be transferred from a compute component 231 to a sense amplifier 206 in response to enabling a pass gate (e.g., activating the PASS and/or PASS* control signals via the TF 262, TT 252, FT 254, and/or FF 264 control signals that are referred to herein as a logical operation selection logic) and the sense amplifier 206 being in a equilibration state. Data can be transferred from a sense amplifier 206 to a compute component 231 in response to enabling the pass gate (e.g., activating the PASS and/or PASS* control signals via the TF 262, TT 252, FT 254, and/or FF 264 control signals that are referred to herein as a logical operation selection logic) and the sense amplifier 206 being in a data storage state. The direction of the transfer of data between the sense amplifier 206 and the compute component 231 is determined by whether the sense amplifier 206 is in an equilibration state or stores a data unit before the PASS and/or PASS* control signals are activated and by a particular operation selected via the logical operation selection logic (e.g., TF 262, TT 252, FT 254, and FF 264 control signals).

For example, if the sense amplifier 206 is equilibrated and the PASS and/or PASS* control signals are activated to provide a conduction path (e.g., electrical continuity) between the sense amplifier 206 and the compute component 231, then a data unit stored in the compute component 231 can be transferred from the compute component 231 to the sense amplifier 206.

If the sense amplifier 206 is configured to store a first bit (e.g., first data unit) and the PASS and/or PASS* control signals are activated to provide a conduction path between the sense amplifier 206 and the compute component 231, then a second bit (e.g., second data unit) that is stored in the compute component 231 before the activation of the PASS and/or PASS* control signals can be replaced by the first bit and the sense amplifier 206 retains the first bit. Furthermore, a number of PIM operations can be performed using the first bit and the second bit using the logical operation selection logic and the result of the operation can be stored in the compute component 231.

Using an equilibration signal to direct the transfer of data between the sense amplifier 206 and the compute component 231 can provide the ability to selectively perform an operation in sense amplifiers that are not equilibrated without performing the operation in sense amplifiers that are equilibrated. For example, a PASS and/or a PASS* control signal can be activated in a plurality of sensing components to move data between a first group of a plurality of sense amplifiers that are equilibrated and a first group of a plurality of compute components. The PASS and/or PASS* control signals can also be activated to move data between a second group of the plurality of sense amplifiers and a second group of the plurality of components that are not equilibrated to selectively perform an operation in a second group of sense components while not performing the operation on a first group of sense components.

Figure 2B:
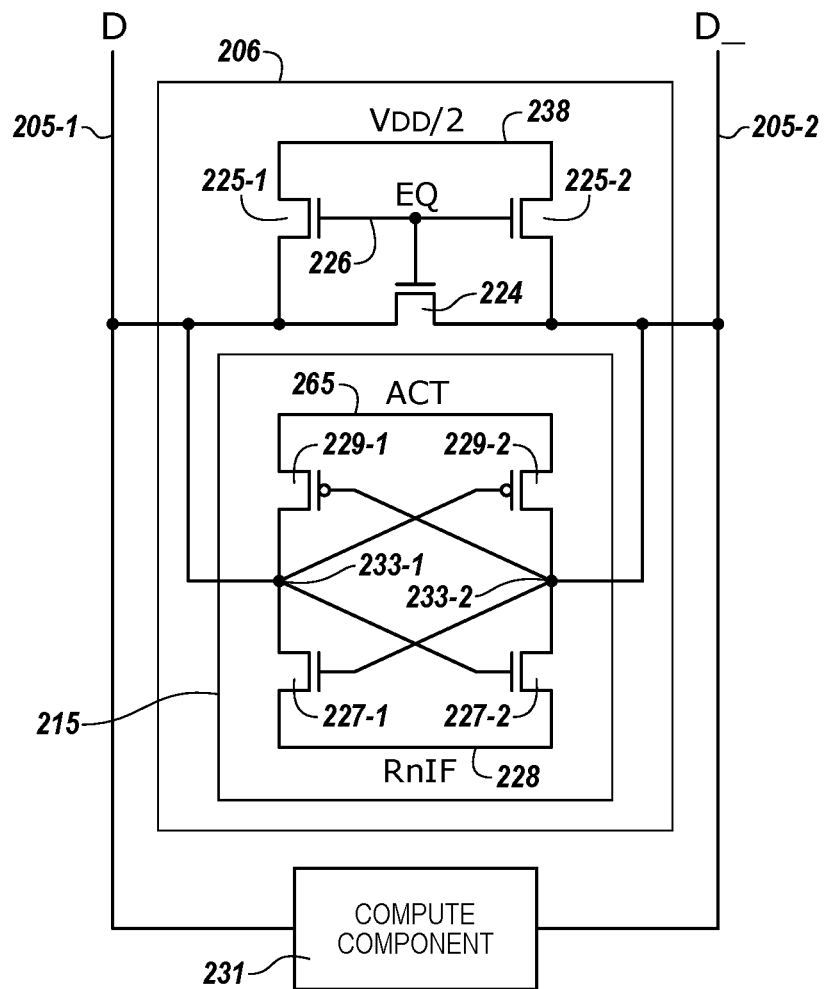

FIG. 2B illustrates a schematic diagram of a portion of sensing circuitry in accordance with a number of embodiments of the present disclosure. The portion of the sensing circuitry shown in FIG. 2B can correspond to a portion of the sensing circuitry 250 shown in FIG. 2A, for example. According to various embodiments, a sense amplifier 206 can comprise a cross coupled latch. However, embodiments of the sense amplifier 206 are not limited to a cross coupled latch. For example, the sense amplifier 206 in FIG. 2B can be current-mode sense amplifier and/or single-ended sense amplifier (e.g., sense amplifier coupled to one data line). Embodiments of the present disclosure also are not limited to a folded data line architecture.

In a number of embodiments, a sense amplifier 206 can comprise a number of transistors formed on pitch with the transistors of the corresponding compute component 231 and/or the memory cells of an array (e.g., memory array 130 shown in FIG. 1A) to which they are coupled, which may conform to a particular feature size (e.g., $4F^2$, $6F^2$, etc.). Sense amplifier 206 comprises a latch 215 including four transistors coupled to a pair of complementary data lines D 205-1 and D_205-2. The latch 215 can be a cross coupled latch. For example, the gates of a pair of transistors, such as n-channel transistors (e.g., NMOS transistors) 227-1 and 227-2 can be cross coupled with the gates of another pair of transistors, such as p-channel transistors (e.g., PMOS transistors) 229-1 and 229-2. As described further herein, the latch 215 comprising transistors 227-1, 227-2, 229-1, and 229-2 can be referred to as a primary latch. However, embodiments are not limited to this example.

The voltages and/or currents on the respective data lines D and D_ can be provided to the respective latch inputs 233-1 and 233-2 of the cross coupled latch 215 (e.g., the input of the primary latch). In this example, the latch input 233-1 is coupled to a first source/drain region of transistors 227-1 and 229-1 as well as to the gates of transistors 227-2 and 229-2. Similarly, the latch input 233-2 can be coupled to a first source/drain region of transistors 227-2 and 229-2 as well as to the gates of transistors 227-1 and 229-1. The compute component 231, which may be referred to herein as an accumulator, can be coupled to latch inputs 233-1 and 233-2 of the cross coupled latch 215 as shown. However, embodiments are not limited to the example shown in FIG. 2B.

In this example, a second source/drain region of transistors 227-1 and 227-2 can be commonly coupled to a negative control signal (RnIF) 228. A second source/drain region of transistors 229-1 and 229-2 can be commonly coupled to an active positive control signal (ACT) 265. The ACT signal 265 can be a supply voltage (e.g., $V_{DD}$) and the RnIF signal can be a reference voltage (e.g., ground). RnIF signal 228 and ACT signal 265 can function as activating signals that enable the cross coupled latch 215.

The enabled cross coupled latch 215 can operate to amplify a differential voltage between latch input 233-1 (e.g., first common node) and latch input 233-2 (e.g., second common node) such that latch input 233-1 is driven to one of the ACT signal voltage and the RnIF signal voltage (e.g., to one of $V_{DD}$ and ground), and latch input 233-2 is driven to the other of the ACT signal voltage and the RnIF signal voltage.

The sense amplifier 206 can also include circuitry configured to equilibrate the data lines D and D_ (e.g., in association with preparing the sense amplifier for a sensing operation). In this example, the equilibration circuitry comprises a transistor 224 having a first source/drain region coupled to a first source/drain region of transistor 225-1 and data line D 205-1. A second source/drain region of transistor 224 can be coupled to a first source/drain region of transistor 225-2 and data line D_ 205-2. A gate of transistor 224 can be coupled to gates of transistors 225-1 and 225-2.

The second source drain regions of transistors 225-1 and 225-2 can be coupled to an equilibration voltage 238, which can be equal to $V_{DD}/2$, where $V_{DD}$ is a supply voltage associated with the array. The gates of transistors 224, 225-1, and 225-2 can be coupled to control signal 226 (EQ). As such, activating EQ can enable the transistors 224, 225-1, and 225-2, which can effectively short data line D to data line D_ such that the data lines D and D_ are equilibrated to equilibration voltage $V_{DD}/2$. As described herein, a number of logical operations and/or shift operations can be performed using the sense amplifier 206 and compute component 231, and the result can be at least temporarily stored in the sense amplifier and/or compute component.

As described herein, the sense amplifier 206 can, in conjunction with the compute component 231, be operated to perform various logical operations and/or shift operations (e.g., using data from an array as input). In a number of embodiments, the result of a logical operation and/or shift operation can be stored back to the array without transferring the data via a data line address access (e.g., without firing a column decode signal such that data is transferred to circuitry external to the array and sensing circuitry via local I/O lines). As such, a number of embodiments of the present disclosure can enable performing various PIM operations (e.g., logical operations, shift operations, mathematical operations, data movement operations using shared I/O lines, etc.) using less power than various previous approaches. Additionally, because a number of embodiments can reduce or eliminate moving (e.g., copying, transferring) data across I/O lines in order to perform operations (e.g., between memory and a discrete processor, which may be off pitch), a number of embodiments may enable an increased parallel processing capability as compared to previous approaches.

FIG. 2C shows logic tables illustrating selectable logical operation results implemented by sensing circuitry in accordance with a number of embodiments of the present disclosure. The four logic selection control signals (e.g., TF, TT, FT, and FF) described in connection with the sensing circuitry 250 shown in FIG. 2A, in conjunction with a particular data unit (e.g., sensed on the complementary sense lines), can be used to select one of a plurality of logical operations to implement involving data units in the sense amplifier 206 and/or compute component 231. The four control signals, in conjunction with the particular data unit, controls the state (conducting or not conducting) of the pass gates 207-1 and 207-2 and swap transistors 242, which in turn affects the data unit in the compute component 231 and/or sense amplifier 206 before/after firing. The capability to selectably control the state of the swap transistors 242 facilitates implementing logical operations involving inverse data units (e.g., to inverse operands and/or inverse a result of an operation), among others.

Logic Table 213-1 illustrated in FIG. 2C shows the starting data unit stored in the compute component 231 in FIG. 2A shown in column A at 244, and the starting data unit stored in the sense amplifier 206 shown in column B at 245. The other three column headings in Logic Table 213-1 refer to the state of the pass gates 207-1 and 207-2 and the swap transistors 242, which can respectively be controlled to be OPEN (e.g., conducting/on) or CLOSED (e.g., not conducting/off) depending on the state of the four logic selection control signals (e.g., TF, TT, FT, and FF), in conjunction with a particular data unit (e.g., present on the pair of complementary sense lines 205-1 and 205-2) when the ISO control signal is activated. The "Not Open" column corresponds to the pass gates 207-1 and 207-2 and the swap transistors 242 both being in a non-conducting condition, the "Open True" corresponds to the pass gates 207-1 and 207-2 being in a conducting condition, and the "Open Invert" corresponds to the swap transistors 242 being in a conducting condition. The configuration corresponding to the pass gates 207-1 and 207-2 and the swap transistors 242 both being in a conducting condition is not reflected in Logic Table 213-1 because this can result in the sense lines being shorted together.

The logic tables illustrated in FIG. 2C can reflect a result initially stored in the compute component 231 in FIG. 2A. Therefore, when the pass gates 207-1 and 207-2 are controlled to be CLOSED (e.g., not conducting), the result initially stored in the compute component 231 is the same as the starting data unit in the compute component 231. However, because the sense sensing circuitry 250 is configured such that the sense amplifier 206 can overpower the compute component 231, as shown in the "Not Open" column 256 of the Logic Table 213-1, the result initially stored in the compute component 231 is the same as the starting data unit in the sense amplifier 206 when the pass gates 207-1 and 207-2 are controlled to be OPEN (e.g., conducting) as shown in the "Open True" column 270 of the Logic Table 213-1. The compute component 231 can be inverted as shown in the "Open Invert" column 271 when the swap transistors 242 are in a conducting condition.

Via selective control of the state of the pass gates 207-1 and 207-2 and the swap transistors 242, each of the three columns of the upper portion of Logic Table 213-1 can be combined with each of the three columns of the lower portion of Logic Table 213-1 to provide 3×3=9 different result combinations, corresponding to nine different logical operations, as indicated by the various connecting paths shown at 275. The nine different selectable logical operations that can be implemented by the sensing circuitry 250 are summarized in Logic Table 213-2 illustrated in FIG. 2C.

The columns of Logic Table 213-2 illustrated in FIG. 2C show a heading 280 that includes the state of logic selection control signals. For example, the state of a first logic selection control signal is provided in row 276, the state of a second logic selection control signal is provided in row 277, the state of a third logic selection control signal is provided in row 278, and the state of a fourth logic selection control signal is provided in row 279. The particular logical operation corresponding to the results is summarized in row 247.

For example, the results for the values of FF, FT, TF, and TT of "0000" are summarized as "A" because the result (initially stored in the compute component after the sense amplifier fires) is the same as the starting value in the compute component. Other columns of results are similarly annotated in row 247, where "A*B" intends A AND B, "A+B" intends A OR B, and "A×B" intends A×OR B. By convention, a bar over a data unit or a logical operation indicates an inverted value of the quantity shown under the bar. For example, A×B bar intends not A XOR B, which is also A×NOR B.

Accordingly, PIM operations, as described herein, can be performed using the sense amplifiers 206 and compute components 231 in the sensing circuitry 250 (e.g., in a number of sensing component stripes 124 corresponding to a respective number of subarrays 125). Prioritized DRAM operations (e.g., read and/or write operations, among others) may use the sense amplifiers 206, for example, of the sensing circuitry 250 as a shared resource in performance of such operations, which can represent a conflict for usage of the sense amplifiers 206.

Embodiments described herein provide a method to determine timing of operations for a memory device 120. The determination of the timing of operations may be performed by execution of instructions by a processing resource (e.g., control circuitry described in connection with FIG. 3). As shown in and described in connection with FIG. 3, each controller 340-0, . . . , 340-7 for a memory device 320 may comprise respective control circuitry that, in some embodiments, can include control logic 331-0, . . . , 331-7, a sequencer 332-0, . . . , 332-7, and timing circuitry 333-0, . . . , 333-7.

The timing circuitry 333 (e.g., the timing component) can, in various embodiments, include, be associated with, and/or be control logic 331 (e.g., a logic component). The timing circuitry 333 can be configured to, for example, receive requests for performance of PIM and DRAM operations, execute coded machine instructions to initiate such performance, and/or apply a scheduling policy for performance of PIM and DRAM operations, among other actions related to timing of such operations described herein. The coded machine instructions can be, for example, microcode instructions.

A method can include performing a first operation type that uses a shared resource (e.g., sensing circuitry 250) in the memory device. The method can further include applying (e.g., by the timing circuitry 333, as shown in and described in connection with FIG. 3) the scheduling policy for timing of continued performance of the first operation type based upon receipt of a request (e.g., determination of whether a request has been received in input queue 369 shown in and described in connection with FIG. 3) to the memory device for performance of a second operation type that uses the shared resource (e.g., the sensing circuitry 250). In various embodiments, the first operation type may be enabled by configuring the shared resource to perform a computation operation (e.g., a PIM operation) and the second operation type may be enabled by configuring the shared resource to perform a memory operation (e.g., a DRAM read and/or write operation). As such, the shared resource can include a sense amplifier configured to be used in performance of both the first operation type and the second operation type.

Applying the scheduling policy to the shared resource can include providing a conflict free usage of the shared resource by the first operation type and the second operation type. For example, application of the scheduling policy can reduce or prevent substantially simultaneous usage of sense amplifiers 206 of the sensing circuitry 250 by reducing or preventing substantially simultaneous performance of the first operation type and the second operation type, which would otherwise both use at least one of the sense amplifiers 206 (e.g., and also, in some embodiments, at least one of the compute components 231).

In some embodiments, performing the first operation type can include performing a PIM operation and performing the second operation type can include performing a DRAM operation (e.g., a DRAM read operation and/or a DRAM write operation). Applying the scheduling policy can, as described herein, include applying a priority to (e.g., prioritizing for preferential performance) a request to the PIM device for the DRAM read and/or write operation over continued performance of the PIM operation (e.g., over performance of the PIM operation without interruption). In some embodiments, performing the first operation type can include performing a sequence of sub-operations (e.g., when performing a sequence of Boolean sub-operations, a sequence of data movement sub-operations (cycles), etc.). Performance of the sub-operations of the sequence may be interruptible between the sub-operations to interleave performance of the second operation type.

Performing the first operation type (e.g., a PIM operation) can include using a sense amplifier 206 and a compute component 231 in the sensing circuitry 250 of the shared resource. Performing the second operation type (e.g., a DRAM operation) can include using the sense amplifier 206 and not the compute component 231 in the sensing circuitry 250 of the shared resource. As such, using the sense amplifier 206 of the shared resource substantially simultaneously is a potential conflict between performing the first operation type and performing the second operation type.

As described herein, a data value can be received to (e.g., at least temporarily stored and/or cached in) sensing circuitry 231 to enable performance of a sub-operation in a sequence of sub-operations for the first operation type. The method can include determining that no request is pending (e.g., in input queue 369) for performance of the second operation type and maintaining the data value in the sensing circuitry 231 between performance of a first sub-operation and performance of a second sub-operation in the sequence. Maintaining as used herein is intended to mean not erasing the data value and/or not equilibrating the sensing circuitry in which the data value is stored. In contrast, determining that a request is actually pending for performance of the second operation type can result in erasure (e.g., equilibration) of the data value between performance of the first sub-operation and the second sub-operation in the sequence (e.g., as instructed by the controller 340 and/or timing circuitry 333 shown in and described in connection with FIG. 3). In various embodiments, the second operation type (e.g., DRAM operation) and/or a different third operation type (e.g., copying data values from a sense amplifier to a compute component or vice versa) may be interleaved between the first operation type (e.g., PIM operations and/or PIM sub-operations). As used herein, a first cycle and a second cycle are intended to mean two adjacent cycles anywhere in a sequence of sub-operations of the first operation type and not necessarily the initial cycle at the beginning of the sequence followed by the second sub-operation in the sequence.

Figure 3:
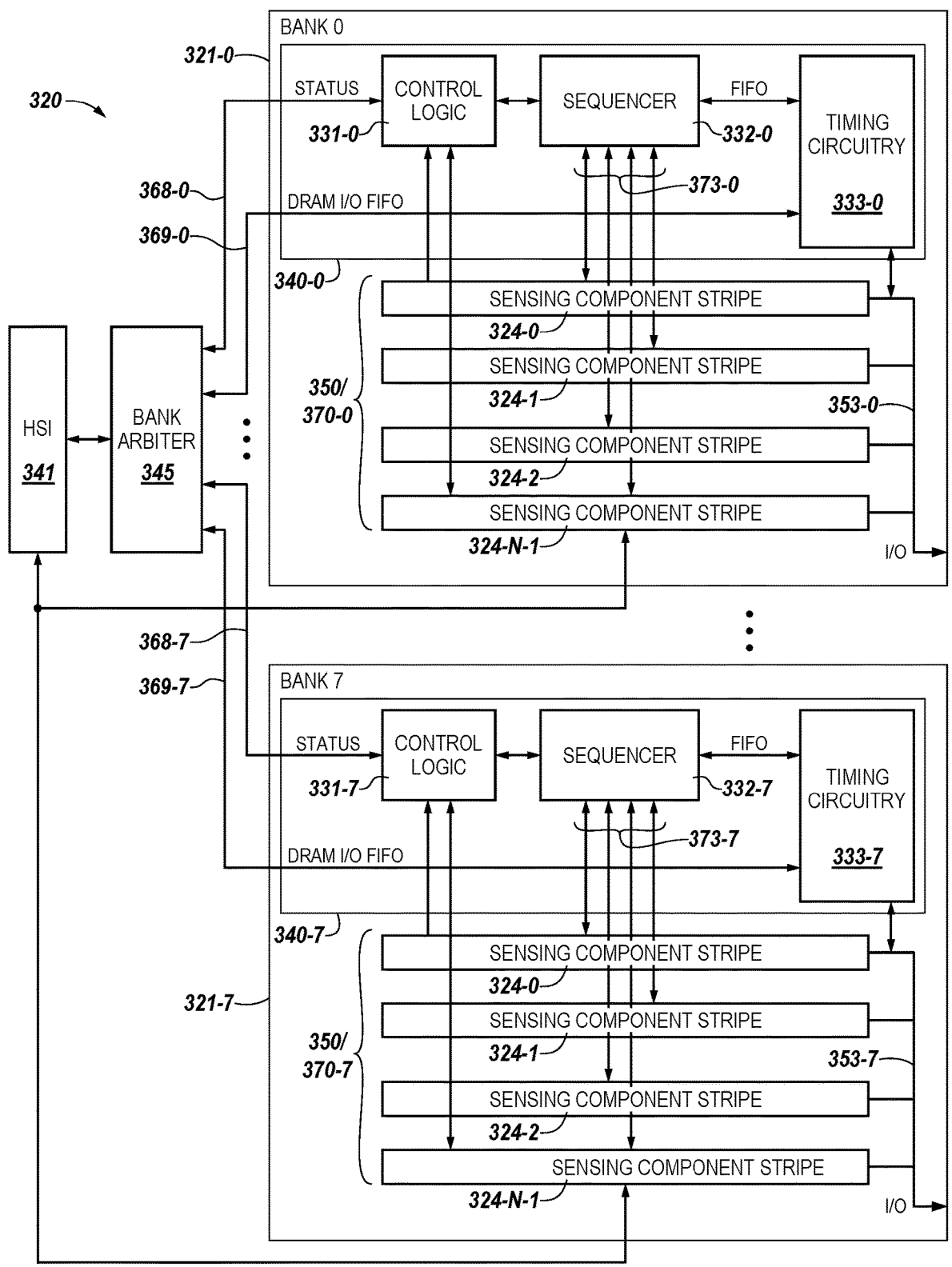
FIG. 3 is a block diagram of a memory device in accordance with a number of embodiments of the present disclosure.

FIG. 3 is a block diagram of a memory device 320 in accordance with a number of embodiments of the present disclosure. The memory device 320 shown in FIG. 3 has PIM capabilities, as described in connection with memory devices 120 shown in FIGS. 1A and 1B and sensing circuitry 250 in FIGS. 2A-2C.

As shown in FIG. 3, a HSI 341 may be coupled to a bank arbiter 345 in the PIM device 320. In various embodiments the HSI 141 may be configured to receive commands and/or data from a host 110, as described in connection with and shown in FIG. 1A. Alternatively or in addition, the HSI 341 may receive commands and/or data from a channel controller 143 via an address/control (A/C) bus 154, a data bus 156, and/or an 00B bus 157 as illustrated in FIG. 1A. In various embodiments, the bank arbiter 345 may be coupled to a plurality of banks 321-0, . . . , 321-7 including associated arrays 130 and registers.

In the example of FIG. 3, each bank 321-0, . . . , 321-7 may be configured with a respective controller 340-0, . . . , 340-7. The controllers 340-0, . . . , 340-7 may represent one or more portions of the controller 140 described in connection with FIGS. 1A and 1B. As shown in FIG. 3, each controller 340-0, . . . , 340-7 may comprise respective control circuitry that, in some embodiments, can include control logic 331-0, . . . , 331-7, a sequencer 332-0, . . . , 332-7, and timing circuitry 333-0, . . . , 333-7. In some embodiments, the control circuitry may collectively be termed a state machine.

In some embodiments, the control logic 331-0, . . . , 331-7 may be responsible for fetching coded machine instructions (e.g., microcode instructions) from an array of memory cells (e.g., a DRAM array) in each bank 321-0, . . . , 321-7 (e.g., as a DRAM operation). The control logic 331-0, . . . , 331-7 may decode, for example, the microcode instructions into calls (e.g., microcode functions), implemented by the sequencers 332-0, . . . , 332-7. The microcode functions can be the operations that the sequencers 332-0, . . . , 332-7 receive and operate on to cause the PIM device 320 to perform particular PIM operations, which may include the PIM operations described herein.

For example, the control logic 331 can fetch machine instructions, which when executed, direct performance of PIM operations by the sensing circuitry 250 (e.g., in sensing component stripes 124-0, . . . , 124-N−1 in FIG. 1B) on pitch with the subarrays (e.g., 125-0, 125-1, . . . , 125-N−1 in FIG. 1B) in each bank 321-0, . . . , 321-7. In some embodiments, control logic 331, a sequencer 332, and/or timing circuitry 333 also may be on chip with the subarrays in a respective bank 321. In some embodiments, the control logic 331, sequencer 332, and timing circuitry 333 may be part of the controller 340, such that the sequencer 332 and/or the timing circuitry 333 can be configured to execute the received machine instructions (e.g., fetched by the control logic 331). Operations performed based on execution of the machine instructions can, as described herein, include timing of continuation of initiated PIM operations (e.g., sequences of Boolean logical operations and/or data movement operations, among others) relative to pending DRAM operations.

For example, the timing circuitry 333, as described herein, can be configured to apply a scheduling policy to the shared resource (e.g., the sense amplifiers 206 of the sensing circuitry 250) that provides a conflict free usage of the shared resource by an initiated PIM operation and a pending DRAM operation. In some embodiments, the sequencers 332-0, . . . , 332-7 and timing circuitry 333-0, . . . , 333-7 may be state machines and the control logic 331-0, . . . , 331-7 may be a very large instruction word (VLIW) type processing resource (e.g., containing a program counter, instruction memory, etc.)

The control logic 331-0, . . . , 231-7 may decode microcode instructions into function calls, which may be microcode function calls, implemented by the sequencers 332-0, . . . , 332-7. The microcode function calls can be the operations that the sequencers 332-0, . . . , 332-7 receive and execute to cause the PIM device 320 to perform particular logical operations using the sensing circuitry, such as sensing circuitry 150 in FIG. 1. The timing circuitry 333-0, . . . , 333-7 may provide timing to coordinate performance of the logical operations and be responsible for providing conflict free access to the arrays, such as array 130 in FIG. 1.

For example, operations may be received to and operated on by the sequencers 332-0, . . . , 332-7 to cause sensing circuitry 250 shown in FIGS. 2A-2C to perform a PIM operation, such as addition, multiplication, etc., and/or, as more specific examples, a Boolean logical operation (e.g., AND, OR, XOR, etc., operations) and/or a data movement operation, as described herein. In this manner, performance of operations and/or execution of corresponding instructions are occurring on a bank 321-0, . . . , 321-7 of a PIM device 320, which are more complex than traditional DRAM read and write operations. Such operations, however, may additionally comprise the DRAM operations, such as a read, write, copy, and/or erase operations, etc. As described in connection with FIGS. 1A and 1B, the controllers 340-0, . . . , 340-7 may be coupled to sensing circuitry 350 and/or logic 370, including caches, buffers, sense amplifiers, latches, and/or registers, associated with arrays of memory cells via control lines and data paths 353. For example, sensing circuitry 350 and logic 370 can further be associated to the arrays of memory cells via data I/O lines shown as 353-0, . . . , 353-7.

In some embodiments, the sequencers 332-0, . . . , 332-7 may generate sequences of operation cycles for a DRAM array. For example, each sequence may be designed to perform operations, such as a Boolean logic operation (AND, OR, XOR, etc.), which together achieve a specific function. In various embodiments, such cycles may be involved, for example, in repetitively calculating the logic equations for a one (1) bit add in order to calculate a multiple bit sum, and/or, as more specific examples, cycles of the Boolean logical operation and/or the data movement operations described herein. A PIM operation, as described herein, may be a plurality of PIM sub-operations. A number of the plurality of PIM sub-operations can include a number of a plurality of cycles for movement of the data from a first row in the source location to a second row in the destination location. In some embodiments, PIM sub-operations performed prior to movement of the data may include moving data values from a row to a respective compute component in the sensing circuitry and/or moving the data values from the compute components into the sense amplifiers. The number of the plurality of cycles for movement of the data can, in some embodiments, be determined by dividing a number of columns 122 in the array 130 intersected by a row 119 of memory cells in the array by a respective plurality of shared I/O lines (e.g., 455-1, . . . , 455-M in FIGS. 4A and 4B).

Each of these operations may be fed into a first in/first out (FIFO) buffer provided by the timing circuitry 333-0, . . . , 333-7 for providing timing coordination with the sensing circuitry 350 and/or logic 370 associated with the array of memory cells (e.g., DRAM arrays). In the example embodiment shown in FIG. 3, the timing circuitry 333-0, . . . , 333-7 provide timing and are responsible for providing conflict free access to the arrays from a number of FIFO queues. As such, in at least one embodiment, the timing circuitry 333-0, ..., 333-7 can include, or can be, a timing component coupled to the array and sensing circuitry (e.g., sensing component stripes 124-0, ..., 124-N−1 coupled to subarrays 125-0, 125-1, ..., 125-N−1) and the timing component can be configured to control timing of operations for the sensing circuitry. For example, one FIFO queue 368-0 may support receipt (e.g., input) and processing of PIM operations via control logic 331-0, a sequencer 332-0, and/or timing circuitry 333-0, one FIFO queue 373-0 may be for instruction fetch and/or for microcode instruction fetch (e.g., from subarrays 125-0, 125-1, ..., 125-N−1 via respective sensing component stripes 124-0, 124-1, ..., 124-N−1), and one FIFO queue 369-0 may be for input and output (I/O) of DRAM operations.

Hence, the timing circuitry 333 of the timing component can be coupled to the array and sensing circuitry and can be configured to provide conflict free timing for the PIM operations and DRAM operations on the sensing circuitry. As described herein, to provide conflict free timing is intended to mean to schedule access for use of the shared resource (e.g., sense amplifiers and/or compute components of the sensing circuitry) such that a determination (e.g., a decision) of a continued or an interrupted performance of the PIM operations can be scheduled in advance based upon a determination of whether a request for a pending DRAM operation has been received (e.g., since initiating performance of an on-going PIM operation). The timing circuitry 333 can include logic, as described herein. The logic can be configured to receive a request for performance of a PIM operation, execute microcode instructions to initiate performance of the PIM operation, and receive a request for performance of a DRAM operation. The logic of the timing circuitry 333 can, in some embodiments, apply the scheduling policy based upon an initiated PIM operation and determination of a pending DRAM request (e.g., in the input queue 369). The logic can include, or can be, the timing circuitry to control the conflict free timing of the PIM operations and the DRAM operations on the sensing circuitry. The control circuitry shown in FIG. 3 can, in some embodiments, include the control logic 331 configured to operate on the microcode instructions to receive and/or execute processing of the pending DRAM request. In some embodiments, the sequencer 332 can include, or can be, a state machine configured to retrieve microcode instructions and/or sequence the PIM operations (e.g., where the PIM operations can include logical AND, OR, and XOR operations, among other operations) performed using the sensing circuitry.

As described herein, the logic of the timing circuitry 333 can be configured to apply the scheduling policy by execution of microcode instructions to continue performance of the initiated PIM operation based upon a determination of no pending DRAM request. The initiated PIM operation can be a sequence of PIM sub-operations, as described herein. The scheduling policy can, in some embodiments, operate on microcode instructions to interrupt performance of the sequence of PIM sub-operations between the sub-operations for performance of a pending DRAM operation.

For example, the logic of the timing circuitry 333 can be configured to receive a request for a PIM operation that includes movement of the data from the source location to the destination location, to execute microcode instructions to initiate performance of the data movement operation, and to receive a request for performance of a DRAM operation (e.g., a DRAM read and/or write operation). The logic of the timing circuitry 333 can be further configured to apply the scheduling policy based upon the initiated data movement operation and the determination of a pending DRAM request. A scheduling policy decision can be to continue performance of the initiated data movement operation from a first cycle to a second cycle based upon a determination of no pending DRAM request (e.g., if no DRAM request is pending). An alternative scheduling policy decision can be to interrupt performance of the initiated data movement operation between the first cycle and the second cycle for performance of a pending DRAM operation (e.g., if a DRAM request is pending).

The logic of the timing circuitry 333 can be further configured to operate on microcode instructions to erase (e.g., equilibrate) a data value stored in the sensing circuitry between performance of a first sub-operation and a second sub-operation in a sequence of PIM sub-operations and override the erasure of the data value based upon a determination of no pending DRAM request. Hence, the data value can remain in the sensing circuitry for performance of the second sub-operation.

The logic of the timing circuitry 333 can be configured to operate on microcode instructions to erase (e.g., equilibrate) a data value stored in the sensing circuitry at a selectable time interval during performance of a sequence of PIM sub-operations. For example, the time interval may correspond approximately to time taken between initiation and successful completion of a typical PIM operation and/or sub-operation. However, the logic of the timing circuitry 333 can be further configured to override erasure of the data value at the selectable time interval based upon a determination of no pending DRAM request. Hence, the data value can remain in the sensing circuitry for performance of the sequence of PIM sub-operations.

In various embodiments, both the control logic 331-0, ..., 331-7 and the sequencers 332-0, ..., 332-7 may generate status information, which can be routed back to the bank arbiter 345 via a FIFO interface (e.g., 368-0, ..., 368-7). The bank arbiter 345 may aggregate this status data and report it back to a channel controller, such as a channel controller 143 associated with host 110, via the HSI 341.

Figure 4A:
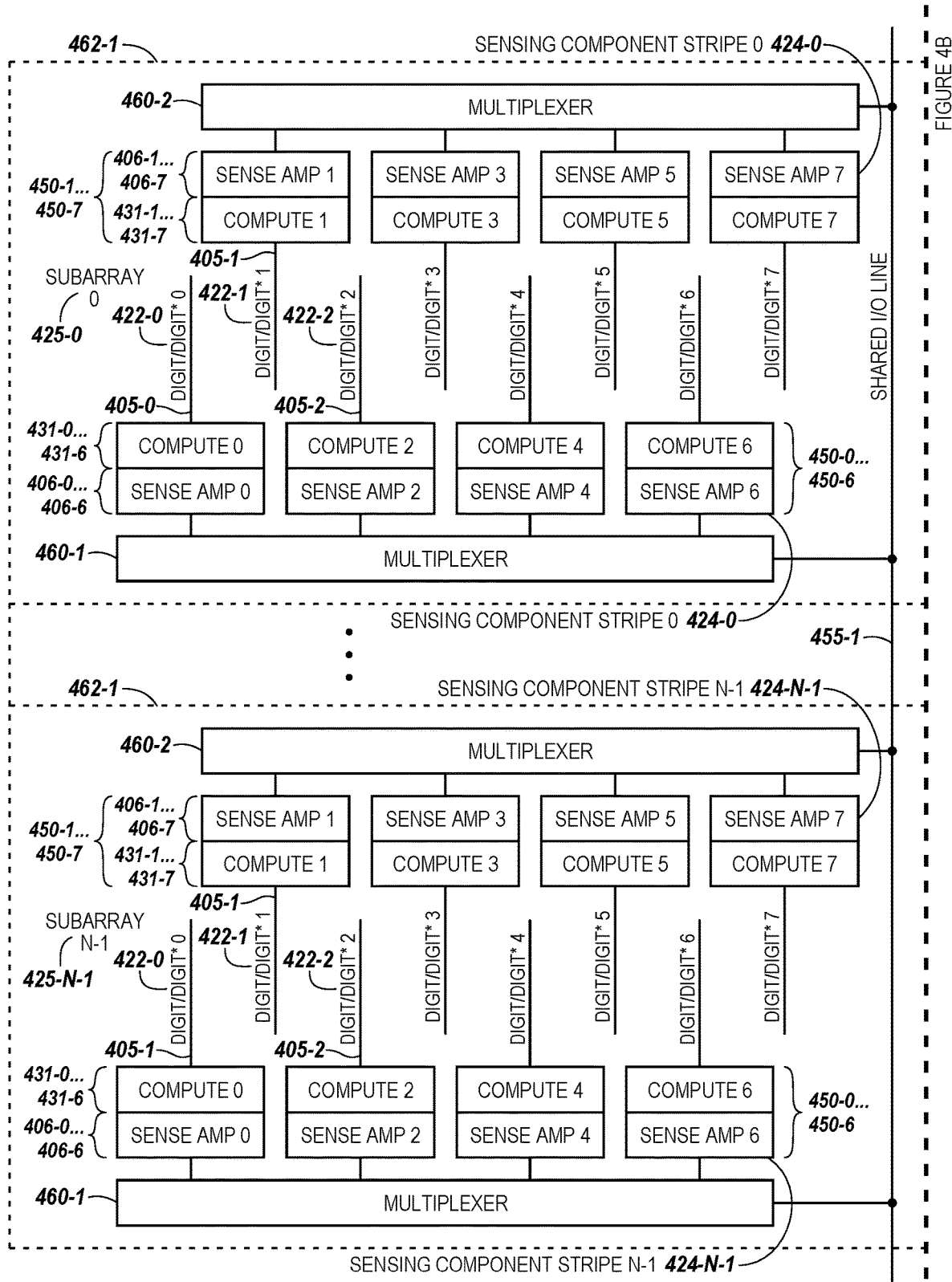
FIGS. 4A and 4B are a schematic diagram illustrating circuitry for data movement in a memory device in accordance with a number of embodiments of the present disclosure.
Figure 4B:
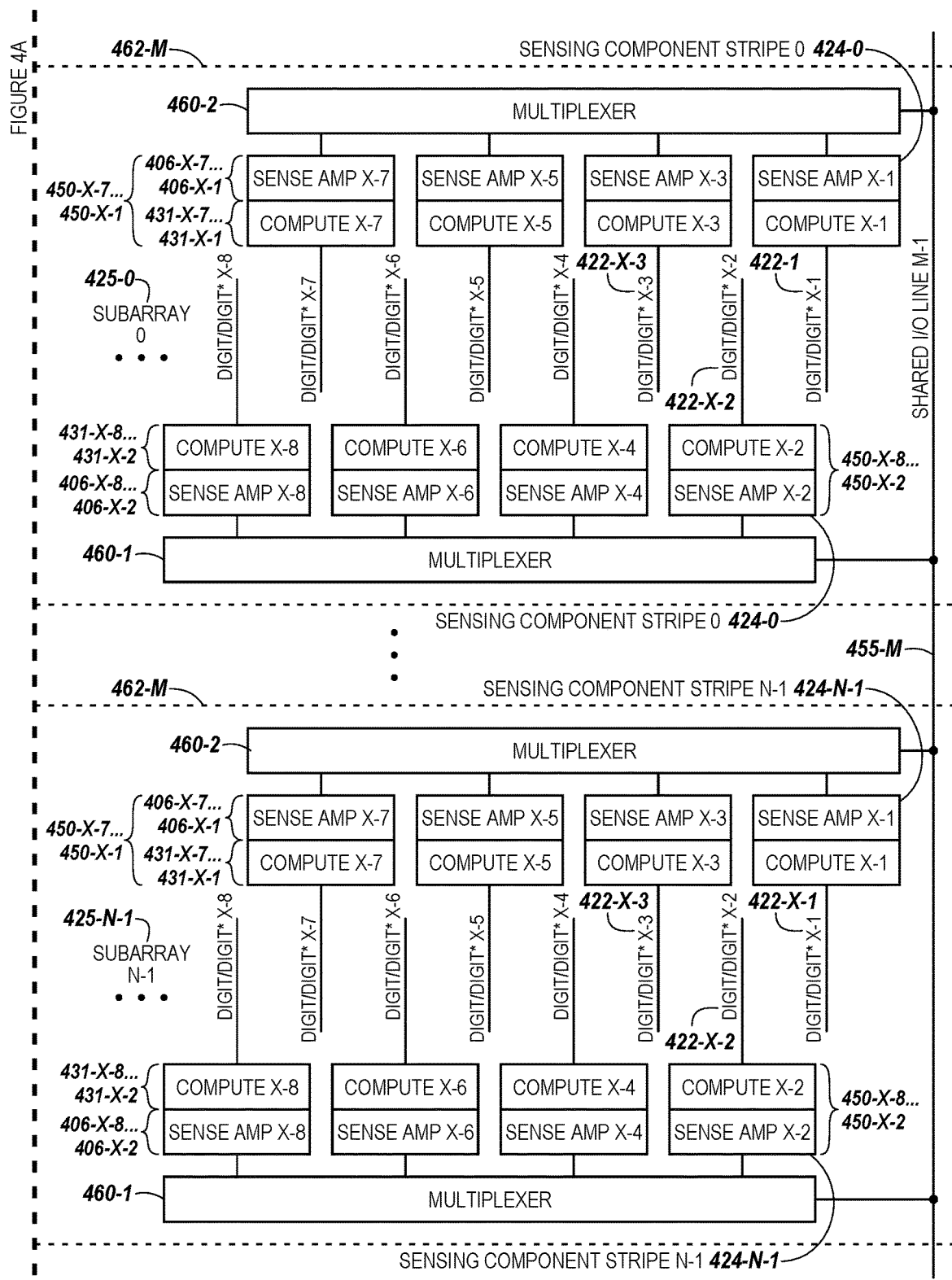

FIGS. 4A and 4B are a schematic diagram illustrating circuitry for data movement in a memory device in accordance with a number of embodiments of the present disclosure. As illustrated in FIG. 1B and shown in more detail in FIGS. 4A and 4B, a bank section of a DRAM memory device can include a plurality of subarrays, which are indicated in FIGS. 4A and 4B at 425-0 as subarray 0 and at 425-N−1 as subarray N−1.

As described herein, a memory device (e.g., 120 in FIG. 1A) can be configured to couple to a host (e.g., 110) via a data bus (e.g., 156) and a control bus (e.g., 154). A bank (e.g., 321 in FIG. 3) in the memory device can include a plurality of subarrays (e.g., 425-0, 425-1, ..., 425-N−1) of memory cells. The bank 321 can include sensing circuitry (e.g., 150 in FIGS. 1A and 1B and corresponding reference numbers in FIGS. 2A, 3, 4A and 4B) coupled to the plurality of subarrays via a plurality of columns (e.g., 422-0, 422-1, ..., 422-X−1) of the memory cells. The sensing circuitry can include a sense amplifier and a compute component (e.g., 406 and 431, respectively) coupled to each of the columns.

FIGS. 4A and 4B, which are to be considered as horizontally connected, illustrate that each subarray (e.g., subarray 425-0 partly shown in FIG. 4A and partly shown in FIG. 4B) can have a number of associated sense amplifiers 406-0, 406-1, ..., 406-X−1 and compute components 431-0, 431-1, ..., 431-X−1. For example, each subarray, 425-0, ..., 425-N−1, can have one or more associated sensing component stripes (e.g., 124-0, . . . , 124-N-1 in FIG. 1B). As described herein, each subarray, 425-0, . . . , 425-N-1, can be split into portions 462-1 (shown in FIG. 4A), 462-2, . . . , 462-M (shown in FIG. 4B). The portions 462-1, . . . , 462-M may each respectively include a particular number (e.g., 2, 4, 8, 16, etc.) of the sense amplifiers and compute components (e.g., sensing circuitry 150), along with the corresponding columns (e.g., 422-0, 422-1, . . . , 422-7) among columns 422-0, . . . , 422-X-1, that can be selectably coupled to a given shared I/O line (e.g., 455-M). Corresponding pairs of the sense amplifiers and compute components can contribute to formation of the sensing circuitry indicated at 450-0, 450-1, . . . , 450-X-1 in FIGS. 4A and 4B.

In some embodiments, as shown in FIGS. 4A and 4B, the particular number of the sense amplifiers and compute components, along with the corresponding columns, that can be selectably coupled to a shared I/O line 455 (which may be a pair of shared differential lines) can be eight. The number of portions 462-1, 462-2, . . . , 462-M of the subarray can be the same as the number of shared I/O lines 455-1, 455, 2, . . . , 455-M that can be coupled to the subarray. The subarrays can be arranged according to various DRAM architectures for coupling shared I/O lines 455-1, 455, 2, . . . , 455-M between subarrays 425-0, 425-1, . . . , 425-N-1.

For example, for portion 462-1 of subarray 0 (425-0) in FIG. 4A, sense amplifier 0 (406-0) and compute component 0 (431-0) can be coupled to column 422-0. As described herein, a column can be configured to include a pair of complementary digit lines referred to as digit line 0 and digit line 0*. However, alternative embodiments can include a single digit line 405-0 (sense line) for a single column of memory cells. Embodiments are not so limited.

As illustrated in FIG. 1B and shown in more detail in FIGS. 4A and 4B, a sensing component stripe can, in various embodiments, extend from one end of a subarray to an opposite end of the subarray. For example, as shown for subarray 0 (425-0), sensing component stripe 0 (424-0), which is shown schematically above and below the DRAM columns in a folded sense line architecture, can include and extend from sense amplifier 0 (406-0) and compute component 0 (431-0) in portion 462-1 to sense amplifier X-1 (406-X-1) and compute component X-1 (431-X-1) in portion 462-M of subarray 0 (425-0).

The configuration illustrated in FIGS. 4A and 4B for the sense amplifiers 406-0, 406-1, . . . , 406-X-1 in combination with the compute components 431-0, 431-1, . . . , 431-X-1 and shared I/O line 0 (455-1) through shared I/O line M-1 (455-M) is not limited to half the combination of the sense amplifiers with the compute components of the sensing circuitry (450) being formed above the columns of memory cells and half being formed below the columns of memory cells 422-0, 422-1, . . . , 422-X-1 in a folded DRAM architecture. For example, in various embodiments, a sensing component stripe 424 for a particular subarray 425 can be formed with any number of the sense amplifiers and compute components of the sensing component stripe being formed above and/or below the columns of memory cells. Accordingly, in some embodiments as illustrated in FIG. 1B, all of the sense amplifiers and compute components of the sensing circuitry and corresponding sensing component stripes can be formed above or below the columns of memory cells.

As illustrated in FIGS. 4A and 4B, in each subarray (e.g., subarray 425-0) one or more multiplexers 460-1 and 460-2 can be coupled to the sense amplifiers and/or compute components of each portion 462-1, 462-2, . . . , 462-M of the sensing component stripe 424-0 for the subarray. The multiplexers 460 illustrated in connection with FIGS. 4A and 4B can, in various embodiments, include the functionality contained in column select circuitry (not shown). The multiplexers 460-1 and 460-2 can be configured to access, select, receive, coordinate, combine, and/or move (e.g., transport) the data values (e.g., bits) stored (e.g., cached) by the number of selected sense amplifiers and/or compute components in a portion (e.g., portion 462-1) of the subarray to the shared I/O line (e.g., shared I/O line 455-1). The multiplexers can be formed between the sense amplifiers and compute components and the shared I/O line. As such, a shared I/O line, as described herein, can be configured to couple a source location and a destination location between pairs of bank section subarrays for improved data movement.

The multiplexers 460 for each subarray can be configured to implement data movement operations with respect to particular columns 422 of a subarray, such as subarray 425-0, and the complementary digit lines thereof, coupling stored data values from the sense amplifiers 406 and/or compute components 431 to given shared I/O lines 455-1, . . . , 455-M (e.g., which may be complementary shared I/O lines corresponding to complementary digit lines). For example, the controller (e.g., 140 or 340) can direct that data values of memory cells in a particular row 119 of subarray 425-0 be sensed and moved to a same or different numbered row of one or more subarrays 425-1, 425-2, . . . , 425-N-1 in a same or different numbered column. In some embodiments, the data values can be moved from a portion of a first subarray to a different portion of a second subarray (e.g., not necessarily from portion 462-1 of subarray 0 to portion 462-1 of subarray N-1). In some embodiments, data values may be moved from a column in portion 462-1 to a column in portion 462-M using shifting techniques.

The multiplexers 460 can direct (e.g., via column select circuitry) movement (e.g., sequential movement) of data values for each of the eight columns (e.g., digit/digit*) in the portion of the subarray (e.g., portion 462-1 of subarray 425-0) such that the sense amplifiers and/or compute components of the sensing component stripe (e.g., 424-0) for that portion can store (cache) and move all data values to the shared I/O line in a particular order (e.g., in an order in which the columns were sensed). With complementary digit lines (digit/digit*) and complementary shared I/O lines 455 for each of eight columns, there can be 16 data values (e.g., bits) sequenced to the shared I/O line from one portion of the subarray such that one data value (e.g., bit) is input to each of the complementary shared I/O lines at a time from each of the sense amplifiers and/or compute components.

As such, with 2048 portions of subarrays each having eight columns (e.g., subarray portion 462-1 of each of subarrays 425-0, 425-1, . . . , 425-N-1), and each portion configured to couple to a different shared I/O line (e.g., 455-1 through 455-M), 2048 data values (e.g., bits) could be moved to the plurality of shared I/O lines at substantially the same point in time (e.g., in parallel). This example could result in eight sequential cycles of moving the 2048 data values corresponding to each of the eight data values in a row intersected by the eight columns in each of the 2048 portions. Accordingly, the plurality of shared I/O lines might be, for example, at least a thousand bits wide (e.g., 2048 bits wide), so as to increase the speed, rate, and/or efficiency of data movement in a DRAM implementation (e.g., relative to a 64 bit wide data path).

As described herein, a controller (e.g., 140) can be coupled to a bank (e.g., as shown at 321 in FIG. 3) of a memory device to execute a command to move data in the bank from a source location (e.g., subarray 425-0) to a destination location (e.g., subarray 425-N−1). A bank section 123 can, in various embodiments, include a plurality of subarrays of memory cells in the bank section (e.g., subarrays 125-0 through 125-N−1 and 425-0 through 425-N−1). The bank section 123 can, in various embodiments, further include sensing circuitry (e.g., 150) coupled to the plurality of subarrays via a plurality of columns (e.g., 422-0, 422-1, . . . , 422-X−1) of the memory cells. The sensing circuitry can include a sense amplifier and a compute component (e.g., 206 and 231, respectively, in FIG. 2 and at corresponding reference numbers in FIGS. 4A and 4B) coupled to each of the columns and configured to implement the command to move the data.

The bank section can, in various embodiments, further include a shared I/O line (e.g., 455-1 and 455-M) to couple the source location and the destination location to move the data. In addition, the controller can be configured to direct the plurality of subarrays and the sensing circuitry to perform a data write operation on the moved data to the destination location in the bank section (e.g., a selected memory cell in a particular row and/or column of a different selected subarray).

According to various embodiments, the apparatus can include a sensing component stripe (e.g., 124 and 424) including a number of sense amplifiers and compute components that corresponds to a number of columns of the memory cells (e.g., where each column of memory cells is configured to couple to a sense amplifier and/or a compute component). The number of sensing component stripes in the bank section (e.g., 424-0 through 424-N−1) can correspond to a number of subarrays in the bank section (e.g., 425-0 through 425-N−1).

The number of sense amplifiers and/or compute components can be selectably (e.g., sequentially) coupled to the shared I/O line (e.g., by multiplexers 460-1 and 460-2 through column select circuitry). The multiplexers 460-1 and 460-2 can be configured to selectably couple a shared I/O line to, for example, one or more of eight sense amplifiers and/or compute components in the source location (e.g., as shown in subarray portions 462-1 through 462-M in FIGS. 4A and 4B). As such, each of the eight sense amplifiers and/or compute components in the source location can be sequentially coupled to the shared I/O line as sub-operations in a PIM data movement operation. In some embodiments, a number of shared I/O lines formed in the array can correspond to a division of a number of columns in the array by the eight sense amplifiers and/or compute components that can be selectably coupled to each of the shared I/O lines. For example, when there are 16,384 columns in the array (e.g., bank section), or in each subarray thereof, and one sense amplifier and compute component per column, 16,384 columns divided by eight yields 2048 shared I/O lines.

As described herein, a source sensing component stripe (e.g., 124 and 424) can include a number of sense amplifiers and/or compute components that can be selected and configured to move (e.g., copy, transfer, and/or transport) data values (e.g., a number of bits) sensed from a row of the source location in parallel to a plurality of shared I/O lines. For example, in response to commands for sequential sensing through the multiplexer 460, the data values stored in memory cells of selected columns of a row of the subarray can be sensed by and stored (e.g., cached) in the sense amplifiers and/or compute components of the sensing component stripe until a number of data values (e.g., the number of bits) reaches the number of data values stored in the row and/or a threshold (e.g., the number of sense amplifiers and/or compute components in the sensing component stripe) and then move (e.g., copy, transfer, and/or transport) the data values via the plurality of shared I/O lines. In some embodiments, the threshold amount of data can correspond to the at least a thousand bit width of the plurality of shared I/O lines.

A controller 340 and/or the associated control circuitry (e.g., as shown in and described in connection with FIG. 3) can, as described herein, be configured to move the data values from a selected row and a selected column in the source location to a selected row and/or a selected column in the destination location via the shared I/O line. In various embodiments, the data values can be moved in response to commands by the controller 340 and/or the associated control circuitry coupled to a particular subarray (e.g., 125-0, 125-1, . . . , 125-N−1 in FIG. 1B) and/or a particular sensing component stripe of the subarray (e.g., 124-0, 124-1, . . . , 124-N−1 in FIG. 1B and at corresponding reference numbers in FIG. 3). The data values in rows of a source (e.g., first) subarray may be moved sequentially to respective rows of a destination (e.g., second) subarray. In various embodiments, each subarray may include 256, 512, 1024 rows, among other possible numbers or rows. For example, the data values may, in some embodiments, be moved from a first row of the source subarray to a respective first row of the destination subarray, then moved from a second row of the source subarray to a respective second row of the destination subarray, followed by movement from a third row of the source subarray to a respective third row of the destination subarray, and so on until the last row of the subarrays.

According to various embodiments, a selected row and a selected column in the source location (e.g., a first subarray) input to the controller can be different from a selected row and a selected line in the destination location (e.g., a second subarray). As such, a location of the data in memory cells of the selected row and the selected column in the source subarray can be different from a location of the data moved to memory cells of the selected row and/or the selected column in the destination subarray. For example, the source location may be a particular row and digit lines of portion 462-1 of subarray 425-0 in FIG. 4A and the destination may be a different row and digit lines of portion 462-M in subarray 425-N−1 in FIG. 4B.

As described herein, a destination sensing component stripe (e.g., 124 and 424) can be the same as a source sensing component stripe. For example, a plurality of sense amplifiers and/or compute components can be selected and configured (e.g., depending on the command from the controller) to selectably move (e.g., copy, transfer, and/or transport) sensed data to the coupled shared I/O line and selectably receive the data from one of a plurality of coupled shared I/O lines (e.g., to be moved to the destination location). Selection of sense amplifiers and/or compute components in the destination sensing component stripe can be performed using the multiplexers described herein (e.g., 460-1 and 460-2 in FIGS. 4A and 4B) in combination with a controller (e.g., 340-0, . . . , 340-7 in FIG. 3) and/or the associated control circuitry (e.g., timing circuitry) 333-0, . . . , 333-7 in FIG. 3). The controller can, in some embodiments, be configured to write an amount of data (e.g., a number of data bits) selectably received by the plurality of selected sense amplifiers and/or compute components in the destination sensing component stripe to a selected row and/or columns of the destination location in the destination subarray. In some embodiments, the amount of data to write corresponds to the at least a thousand bit width of a plurality of shared I/O lines.

The destination sensing component stripe can, according to some embodiments, include a plurality of selected sense amplifiers and/or compute components configured to receive (e.g., at least temporarily store and/or cache) data values (e.g., bits) when an amount of received data values (e.g., the number of data bits) exceeds the at least a thousand bit width of the plurality of shared I/O lines. The controller can, according to some embodiments, be configured to write the stored data values (e.g., the number of data bits) to a selected row and/or columns in the destination location as a plurality of subsets. In some embodiments, the amount of data values of at least a first subset of the written data can correspond to the at least a thousand bit width of the plurality of shared I/O lines. According to some embodiments, the controller can be configured to write the stored data values (e.g., the number of data bits) to the selected row and/or columns in the destination location as a single set (e.g., not as subsets of data values).

A row 119 can be selected (e.g., opened by the controller and/or subarray controller via an appropriate select line) for the first sensing component stripe and the data values of the memory cells in the row can be sensed. In some embodiments, the data values can be sensed and/or stored by the compute components 231.

After sensing, the data values can be moved (e.g., copied) from the compute components 231 into the sense amplifiers 206 in the first sensing component stripe and the sense amplifiers 206 can be coupled to the shared I/O line. In some embodiments, selected sense amplifiers and/or compute components in the second sensing component stripe also can be coupled to the same shared I/O line. The second sensing component stripe can still be in a pre-charge state (e.g., ready to accept data). After the data values from the sense amplifiers 206 in the first sensing component stripe have been moved to the shared I/O line and/or the selected sense amplifiers 206 and/or compute components 231 in the second sensing component stripe, the data values in the sense amplifiers can be moved (e.g., copied) back into the compute components 231. The data values then can be erased from the sense amplifiers 206 (e.g., the sense amplifiers can be equilibrated) to have the sense amplifiers 206 be available for performance of a potentially pending request for a DRAM operation. As described herein, in some embodiments, this sequence can be performed through eight iterations (e.g., cycles) to move all the data values from a row of 16,384 memory cells having 2048 portions that correspond to 2048 shared I/O lines.

After the data values from the sense amplifiers 206 in the first sensing component stripe have been moved (e.g., driven) into the second sensing component stripe, the second sensing component stripe can fire (e.g., latch) to store the data into respective sense amplifiers and/or compute components. A row coupled to the second sensing component stripe can be opened (e.g., after latching the data) and the data that resides in the sense amplifiers and/or compute components can be written into the destination location of that row.

In some embodiments, 2048 shared I/O lines can be configured as a 2048 bit wide shared I/O line. A number of cycles for moving the data from a first row in the source location to a second row in the destination location can, in some embodiments, be determined by dividing a number of columns in the array intersected by a row of memory cells in the array by the 2048 bit width of the plurality of shared I/O lines. For example, an array (e.g., a bank, a bank section, or a subarray thereof) can have 16,384 columns, which can correspond to 16,384 data values in a row, which when divided by the 2048 bit width of the plurality of shared I/O lines intersecting the row can yield eight separate cycles, each of the separate cycles of 2048 data values being performed at substantially the same point in time (e.g., in parallel) for movement of all the data in the row after sequential completion of the eight separate cycles. Alternatively or in addition, a bandwidth for moving the data from a first row in the source location to a second row in the destination location can be determined by dividing the number of columns in the array intersected by the row of memory cells in the array by the 2048 bit width of the plurality of shared I/O lines and multiplying the result by a clock rate of the controller.

In some embodiments, the source location in the first subarray and the destination location in the second subarray can be in a single bank section of a memory device (e.g., as shown in FIG. 1B and FIGS. 4A-4B). Alternatively or in addition, the source location in the first subarray and the destination location in the second subarray can be in separate banks and bank sections of the memory device coupled to a plurality of shared I/O lines. As such, the data values can be moved (e.g., in parallel) from the first sensing component stripe for the first subarray via the plurality of shared I/O lines to the second sensing component stripe for the second subarray.

The shared I/O line can, in some embodiments, be shared between all sensing component stripes. In various embodiments, one sensing component stripe or one pair of sensing component stripes (e.g., coupling a source location and a destination location) can communicate with the shared I/O line at any given time. As described herein, a source row of a source subarray (e.g., any one of 512 rows) can be different from (e.g., need not match) a destination row of a destination subarray, where the source and destination subarrays can, in various embodiments, be in the same or different banks and bank sections of memory cells. Moreover, a selected source column (e.g., any one of eight configured to be coupled to a particular shared I/O line) can be different from (e.g., need not match) a selected destination column of a destination subarray.

In various embodiments, eight sense amplifiers 406-0, 406-1, . . . , 406-X−1 and/or compute components 431-0, 431-1, . . . , 431-X−1, for example, can each be coupled to a respective pair of complementary sense lines 405-1 and 405-2 (e.g., digit or data lines 205-1 and 205-2 in FIG. 2A) via respective pass gates (e.g., 207-1 and 207-2 in FIG. 2A). For example, the pass gates can be connected as shown in FIG. 2A and can be controlled by an operation selection signal, Pass. An output of the selection logic can be coupled to the gates of the pass gates 207-1 and 207-2 and digit lines 205-1 and 205-2. Corresponding pairs of the sense amplifiers and compute components can contribute to formation of the sensing circuitry indicated at 350-0, . . . , 350-7 in FIG. 3.

Data values present on the pair of complementary digit lines 205-1 and 205-2 can, in some embodiments, be loaded into the compute component 231, as described in connection with FIG. 2A. For example, when the pass gates 207-1 and 207-2 are enabled, data values on the pair of complementary digit lines 205-1 and 205-2 can be passed from the compute component to the sense amplifiers (e.g., 231 to 206) or from the sense amplifiers to the compute component (e.g., 206 to 231). The data values on the pair of complementary digit lines 205-1 and 205-2 can be the data value stored in the compute component 231 and/or the sense amplifier 306-0 when the sense amplifier and/or compute component is fired.

The sense amplifiers 406-0, 406-1, ..., 406-X–1 shown in FIGS. 4A and 4B can each correspond to sense amplifier 206 shown in FIG. 2B. The compute components 431-0, 431-1, ..., 431-X–1 shown in FIGS. 4A and 4B can each correspond to compute component 231 shown in FIG. 2A. A combination of one sense amplifier with one compute component can, in some embodiments, contribute to the sensing circuitry 450-0, 450-1, ..., 450-X–1 in FIGS. 4A and 4B of a portion of a DRAM memory subarray 425 configured to couple to an I/O line 455, ..., 455-M, as described herein. The paired combinations of the sense amplifiers and the compute components can be included in a sensing component stripe, as shown at 124 in FIG. 1B and at 424 in FIGS. 4A and 4B.

The configurations of embodiments illustrated in FIGS. 4A and 4B are shown for purposes of clarity and are not limited to these configurations. For instance, the number of combinations of the sense amplifiers with the compute components forming the sensing circuitry configured as subsets to couple to a shared I/O line is not limited to eight (e.g., the subsets can include 2, 4, 8, 16, etc., combinations of the sense amplifiers with the compute components). In addition, the configuration of the shared I/O line 455 is not limited to being a single I/O line shared by a subset of eight sense amplifiers and compute components and a plurality of subarrays. For example, a shared I/O line can be split into two for separately coupling each of the two sets of complementary digit lines 405-1 and 405-2. Nor is the positioning of the shared I/O line 455 limited to being at either end of the combination of the sense amplifiers and compute components forming the sensing circuitry (e.g., rather than being in the middle of the combination of the sense amplifiers and the compute components).

The multiplexers 460-1 and 460-2 illustrated in FIGS. 4A and 4B can include column select circuitry (not shown) that is configured to implement data movement operations with respect to particular columns 422-0, ..., 422-X–1 of a subarray 425, the single or complementary digit lines 405-1 and 405-2 associated therewith, and the shared I/O lines 455-1, ..., 455-M (e.g., as directed by controller 140 shown in FIGS. 1A and 1B and/or controllers 340-1, ..., 340-7 in FIG. 3). For example, multiplexer 460-1 has select lines 0, 2, 4, and 6 that are configured to couple with corresponding columns, such as column 0, column 2, column 4, and column 6. Multiplexer 460-2 has select lines 1, 3, 5, and 7 that are configured to couple with corresponding columns, such as column 1, column 3, column 5, and column 7.

Controllers 140 and/or 340-0, ..., 340-7 can be coupled to multiplexers 460 to control select lines (e.g., select line 0) to access data values that are stored in the sense amplifiers, compute components, and/or are present on the pair of complementary digit lines (e.g., 405-1 and 405-2 when appropriate selection transistors (not shown) are activated via signals from select line 0). Activating the selection transistors (e.g., as directed by the controller 140) can enable coupling of sense amplifier 406-0, compute component 431-0, and/or single or complementary digit lines 405-1 of column 0 (422-0) to move data values on digit line 0 and digit line 0* to shared I/O line 455-1. For example, the moved data values may be data values from a particular row 119 stored (e.g., cached) in sense amplifier 406-0 and/or compute component 431-0. Data values from each of columns 0 through 7 can similarly be selected by controllers 140 and/or 340-0, ..., 340-7 activating the appropriate selection transistors.

Moreover, enabling (e.g., activating) the appropriate selection transistors can enable a particular sense amplifier and/or compute component (e.g., 406-0 and/or 431-0, respectively) to be coupled with a shared I/O line 455 such that data values stored by an amplifier and/or compute component can be moved to (e.g., placed on, copied, and/or transferred to) the shared I/O line 455 for transport. In some embodiments, one column at a time is selected (e.g., column 422-0) to be coupled to a particular shared I/O line 455-1 to move (e.g., copy, transfer, and/or transport) the stored data values. In some embodiments, a shared I/O line 455 may be a shared, differential I/O line pair (e.g., shared I/O line and shared I/O line*). Hence, selection of column 0 (422-0) could yield two data values (e.g., two bits with values of 0 and/or 1) from a row 119 and/or as stored in the sense amplifier and/or compute component associated with complementary digit lines 405-1 and 405-2. These data values could be input in parallel to each shared, differential I/O pair (e.g., shared I/O and shared I/O*) of the shared differential I/O line 455.

Hence, embodiments described herein provide a method to determine timing of operations in a memory device (e.g., a PIM device). An example of such a method can include configuring a source location and a destination location in the memory device to couple via an I/O line 455 shared by the source location and the destination location. In various embodiments, the source location and the destination location can be in a same subarray or in different subarrays (e.g., subarrays 424-0, ..., 425-N–1 in FIGS. 4A and 4B), or in the same or different banks (e.g., banks 321-0, ..., 321-7 in FIG. 3).

The memory device can include an array of memory cells (e.g., 130 in FIG. 1A). The memory device also can, in various embodiments, include sensing circuitry 450 coupled to the array via a plurality of sense lines (e.g., 405-1 and 405-2). The sensing circuitry 450 can include sense amplifiers 406 and compute components 431 configured to implement computation operations (e.g., PIM operations) and memory operations (e.g., DRAM read and write operations). Timing circuitry 333 can be coupled to the array and sensing circuitry, where the timing circuitry can be configured to provide conflict free timing for the computation operations and the memory operations on the sensing circuitry, as described herein. In some embodiments, a memory device may include a memory array that is an array of PIM DRAM memory cells, as described herein, where the computation operations may be PIM operations and the memory operations may be DRAM operations.

The method can include receiving a command from a controller 140 and/or 340-0, ..., 340-7 to move data from the source location to the destination location. To move the data is intended to mean, in various embodiments, copying a data value from a source location to a destination location or transferring the data value from the source location to the destination location, as described herein. A number of a plurality of data values can be received from the source location (e.g., a row in a subarray), where the number of data values can correspond to a number of a plurality of the sense amplifiers 406 or of a plurality of the compute components 431 in the sensing circuitry 450. For example, whether the number of data values corresponds to the number of sense amplifiers or to the number of compute components can depend upon whether the number of data values are the same as the number of sense amplifiers and/or the same as the number of compute components in the sensing circuitry and/or whether the number of data values are initially stored in the sense amplifiers or the compute components. The method can include moving the data values by initiating movement of the source location data from the sensing circuitry 450 via the shared I/O line 455 to the destination location. Movement of the data, as described herein, can be a PIM operation using the sense amplifiers 406 and compute components 431.

In some embodiments, the method can include moving the number of the plurality of data values from the corresponding number of the plurality of the sense amplifiers or of the plurality of the compute components to the other of a coupled plurality of sense amplifiers or compute components in the sensing circuitry. For example, as described with regard to moving data values from a row that have been received by compute components in preparation for movement (e.g., copying) to rows in 63 other subarrays, the data values can be moved from the compute components into corresponding (e.g., coupled) sense amplifiers.

After moving the data values as such, the other of the plurality of sense amplifiers or compute components to which the data values have been moved can be coupled to the shared I/O line to initiate movement of the data. For example, as just described, the data values can, in some embodiments, be moved to the sense amplifiers, from which the data values can be moved to another subarray via a number of selectably coupled shared I/O lines. For example, the data values can be moved from a number of the compute components to a corresponding number of coupled sense amplifiers and the number of sense amplifiers can be coupled to the shared I/O line to initiate movement of the data. This movement of the data values may be followed by moving the data values back to where they were originally received (e.g., moving the data values in the sense amplifiers back into the compute components) if, for example, there is a request for a pending DRAM operation.

In some embodiments, a number of cycles for moving the data from the sensing circuitry to a row in the destination location can be determined by dividing a number of columns in the array intersected by a row of memory cells in the array by a number of a plurality of shared I/O lines. For example, an array can have 16,384 columns intersecting a row, which can correspond to 16,384 memory cells in the row, which when divided by the 2048 shared I/O lines can yield eight cycles, each separate cycle being at substantially the same point in time (e.g., in parallel) for movement of all the data in the row after completion of the eight separate cycles (e.g., each cycle being performed in sequence at different times). For example, only one of a plurality (e.g., a subset of eight, as shown in FIGS. 4A and 4B) of the sense amplifiers or the compute components in the sensing circuitry of the source location can be coupled at a time to a respective shared I/O line.

As described herein, a determination can be made (e.g., by timing circuitry 333) of whether a request is pending (e.g., in input queue 369) for performance of a DRAM operation. Accordingly, the timing circuitry 333 can apply a scheduling policy based on the determination.

Based upon a determination of no pending DRAM request, a decision can be made (e.g., by the timing circuitry 333) to maintain the number of the plurality of data values from the source location stored in the corresponding number of the plurality of the sense amplifiers or of the plurality of the compute components. Maintaining the number of the plurality of data values can enable continued performance of the initiated data movement operation from a first cycle to a second cycle via the coupled shared I/O line. For example, the continued performance can be performed without a repeat (e.g., another iteration) of receiving the plurality of data values of the source location (e.g., not receiving the plurality of data values from the row of the subarray or from the other of the coupled plurality of sense amplifiers or compute components in the sensing circuitry).

Based upon a determination of a pending DRAM request, a decision can be made (e.g., by the timing circuitry 333) to erase the number of the plurality of data values of the source location stored in the corresponding number of the plurality of the sense amplifiers or of the plurality of the compute components. The erasure can cause a repeat (e.g., another iteration) of receiving the plurality of data values of the source location to enable continued performance of the initiated data movement operation from the first cycle to the second cycle via a recoupled shared I/O line (e.g., the original coupling of the shared I/O line may be terminated after erasure of the data values in the coupled sensing circuitry). In various embodiments, the erasure can be performed by equilibrating the sense amplifiers and/or the compute components.

In some embodiments, the erasure can result in a repeat of receiving the plurality of data values from the row of the subarray via a recoupled shared I/O line. For example, the data values may, after the erasure, be reloaded to the sense amplifiers and/or compute components by movement via the recoupled shared I/O line. In some embodiments, the erasure can result in a repeat of the sense amplifiers and/or compute components receiving (e.g., a reload after the erasure of) the plurality of data values from the other of the coupled plurality of sense amplifiers or compute components in the sensing circuitry without once again moving the data values from the row of the subarray via a recoupled shared I/O line. For example, prior to erasure of a data value from a sense amplifier, the data value may be copied to a corresponding compute component, or vice versa, whereby the appropriate sense amplifiers and/or compute components can again receive (e.g., reload) the plurality of data values to enable continued performance of the initiated data movement operation from the first cycle to the second cycle.

In some embodiments, a beginning of a PIM operation can include moving the data values from the memory cells of a row of a subarray to the coupled sensing circuitry. For example, a beginning of a sequence of Boolean and/or data movement sub-operations, among others, can include moving 16,384 data values from 16,384 memory cells to a sensing component stripe having a combination of 16,384 sense amplifiers and compute components. The 16,384 data values can be received (e.g., at least temporarily stored and/or cached) in either of the 16,384 sense amplifiers or compute components. In some embodiments, the 16,384 data values can be received by the compute components and moved (e.g., copied) to the sense amplifiers.

The sequence of sub-operations can be performed to completion, for example, in 8 cycles of 2048 parallel sub-operations. However, when the control circuitry is configured to erase the data values from the 16,384 sense amplifiers and/or compute components after each cycle to make the sense amplifiers and/or compute components available for performance of a potential DRAM operation, regardless of whether a DRAM operation is actually pending, the 16,384 data values would have to be reloaded in the sensing circuitry seven times to enable completion of the eight cycles of PIM sub-operations. For example, if the data values are erased from both the sense amplifiers and compute components after each cycle, moving the 16,384 data values from the row of the subarray would be repeated seven times (e.g., in eight total iterations). If the data values were moved (e.g., copied) back to the compute components from the sense amplifiers before the sense amplifiers were erased, moving the 16,384 data values from the compute components to the sense amplifiers would be repeated seven times (e.g., in eight total iterations) to enable completion of the eight cycles of PIM sub-operations.

Making the erasure of the data values from the sensing circuitry (e.g., the sense amplifiers) dependent on a determination that a DRAM operation is actually pending (e.g., in input queue 369 in FIG. 3) may enable the 16,384 data values to remain in the 16,384 sense amplifiers until completion of all eight cycles when there is no pending DRAM operation. Hence, the 16,384 data values would only be moved once to the sense amplifiers, for example, rather than being moved to the sense amplifiers eight times. Determining timing of operations as described herein may thus enable PIM operations to be performed in less time and/or using less power by, for example, increasing the speed, rate, and/or efficiency of such operations.

While example embodiments including various combinations and configurations of sensing circuitry, sense amplifiers, compute components, sensing component stripes, shared I/O lines, control circuitry (e.g., including control logic, a sequencer, timing circuitry, etc.), and/or multiplexers, etc., have been illustrated and described herein, embodiments of the present disclosure are not limited to those combinations explicitly recited herein. Other combinations and configurations of the sensing circuitry, sense amplifiers, compute components, sensing component stripes, shared I/O lines, control circuitry (e.g., including control logic, a sequencer, timing circuitry, etc.), and/or multiplexers, etc., disclosed herein are expressly included within the scope of this disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
    a memory array;
    a sensing circuitry coupled to the memory array, the sensing circuitry including a sense amplifier coupled to a respective sense line, wherein the sense amplifier is configured to be used in both a memory operation and a compute operation; and
    a timing circuitry coupled to the array and to the sensing circuitry, wherein the timing circuitry is configured to apply a scheduling policy for timing of continued performance of the compute operation responsive to a request for performance of the memory operation;
    wherein:
        the compute operation is performed, between at least two data values retrieved from the array via the respective sense line, using the sense amplifier; and
        the memory operation is performed using the sense amplifier.

2. The apparatus of claim 1, further comprising a shared resource in the memory device;
    wherein the shared resource comprises the sense amplifier.

3. The apparatus of claim 2, wherein the shared resource is configured to provide a conflict free usage of the shared resource by the memory operation and the compute operation to apply the scheduling policy.

4. The apparatus of claim 1, wherein:
    the sensing circuitry is configured to be used in the memory operation by being used to perform a memory read or write operation; and
    the timing circuitry is configured to apply a priority to a request to the memory device for the memory read or write operation over continued performance of the compute operation.

5. The apparatus of claim 1, wherein the sense amplifier is configured to:
    be used to perform a sequence of sub-operations; and
    allow an interruption between the sub-operations to interleave performance of an additional operation type.

6. The apparatus of claim 1, wherein sense amplifier is further configured to be used to:
    perform the compute operation along with using a compute component;
    perform the memory operation without using the compute component; and
    wherein using the sense amplifier substantially simultaneously is a potential conflict between performing the compute operation and the memory operation.

7. The apparatus of claim 1, wherein the sensing circuitry is further configured to:
    receive a data value; and
    in response to receiving the data value, enable performance of a sub-operation in a sequence of sub-operations for the compute operation.

8. The apparatus of claim 7, wherein the sensing circuitry is further configured to:
    determine that no request is pending for performance of the memory operation; and
    in response to the determination that no request is pending, maintain the data value between performance of a first sub-operation and performance of a second sub-operation in the sequence.

9. The apparatus of claim 7, wherein the timing circuitry is further configured to:
    cause a determination that a request is pending for performance of the memory operation; and
    cause erasure of the data value between performance of a first sub-operation and a second sub-operation in the sequence.

10. An apparatus, comprising:
a sensing circuitry coupled to an array of memory cells via a plurality of sense lines, the sensing circuitry including sense amplifiers configured to be used to implement compute operations and memory read and write operations; and
a timing circuitry coupled to the array of memory cells and the sensing circuitry, the timing circuitry configured to provide conflict free timing for the compute operations and the memory read and write operations on the sensing circuitry; and
a controller configured to cause movement of data values received from a source location from the at least a portion of the sensing circuitry via an input/output (I/O) line to a destination location for a memory operation using the conflict free timing provided by the timing circuitry.

11. The apparatus of claim 10, wherein the controller is further configured to cause:
movement of the data values from a number of compute components coupled to the sensing circuitry to a corresponding number of sense amplifiers of the sensing circuitry; and
coupling the number of sense amplifiers to the shared I/O line to initiate movement of the data values.

12. The apparatus of claim 11, wherein only one of a plurality of the sense amplifiers or the compute components of the source location at a time are coupled to a respective shared I/O line.

13. The apparatus of claim 10, wherein the timing circuitry is further configured to determine whether a request is pending for performance of a DRAM operation.

14. The apparatus of claim 13, wherein the timing circuitry is further configured to apply a scheduling policy for maintaining, based upon no pending DRAM request, the data values from the source location stored in the corresponding number of the sense amplifiers or of the compute components;
wherein:
the maintaining of the number of data values enables continued performance of an initiated data movement operation from a first cycle to a second cycle via the coupled shared I/O line; and
the continued performance is performed without a repeat of receiving the data values of the source location.

15. The apparatus of claim 13, wherein the timing circuitry is further configured to:
apply a scheduling policy for:
erasing, based upon a pending DRAM request, the data values stored in the corresponding number of the sense amplifiers or of the compute components; and
wherein the erasing causes a repeat of receiving the data values to enable continued performance of an initiated data movement operation from the first cycle to the second cycle.

16. An apparatus, comprising:
a memory array;
a sensing circuitry coupled to the memory array, the sensing circuitry:
including a sense amplifier coupled to a respective sense line; and
configured to be used to perform compute operations and memory read and write operations, wherein the sensing circuitry is configured to perform at least one of the compute operations, between at least two data values retrieved from the memory array via the respective sense line, using the sense amplifier;
at least one compute component coupled to the respective sense line and used to perform the compute operations and the memory read and write operations; and
a timing circuitry coupled to the array, to the sensing circuitry, and to the at least one compute component, wherein the timing circuitry is configured to provide conflict free timing for the compute operations and memory read and write operations on the sensing circuitry.

17. The apparatus of claim 16, wherein the timing circuitry comprises logic configured to:
receive a request for a compute operation; and
execute coded instructions to initiate performance of the compute operation.

18. The apparatus of claim 17, wherein the logic is further configured to:
receive a request for a memory operation; and
apply a scheduling policy to schedule performance of the compute operation and the memory operation.

19. The apparatus of claim 16, wherein the timing circuitry comprises logic configured to apply a scheduling policy by execution of coded instructions to continue performance of the initiated data movement operation based upon a determination of no pending memory request.

20. The apparatus of claim 16, wherein the timing circuitry comprises: logic configured to operate on coded instructions to:
erase a data value at a selectable time interval during performance of a sequence of compute sub-operations; and
override erasure of the data value at the selectable time interval based upon a determination of no pending memory request; and
wherein the data value is not erased for performance of the sequence of compute sub-operations.

* * * * *